US012567884B2

(12) United States Patent
Kim et al.

(10) Patent No.: US 12,567,884 B2
(45) Date of Patent: Mar. 3, 2026

(54) APPARATUS AND METHOD FOR PERFORMING BEAM SWEEPING USING RIS PATTERN IN WIRELESS COMMUNICATION SYSTEM

(71) Applicant: Samsung Electronics Co., Ltd., Gyeonggi-do (KR)

(72) Inventors: Donggu Kim, Gyeonggi-do (KR); Woojae Jeong, Gyeonggi-do (KR); Seunghyun Lee, Gyeonggi-do (KR); Jungsoo Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 468 days.

(21) Appl. No.: 18/110,122

(22) Filed: Feb. 15, 2023

(65) Prior Publication Data

US 2024/0129870 A1 Apr. 18, 2024

(30) Foreign Application Priority Data

Oct. 17, 2022 (KR) ........................ 10-2022-0133248

(51) Int. Cl.
H04B 7/04 (2017.01)
H04B 7/06 (2006.01)
(Continued)

(52) U.S. Cl.
CPC ....... H04B 7/04013 (2023.05); H04B 7/0617 (2013.01); H04J 13/0062 (2013.01); H04W 56/0015 (2013.01)

(58) Field of Classification Search
CPC ............. H04W 56/0015; H04W 56/00; H04W 72/0446; H04B 7/0617; H04B 7/0408;
(Continued)

(56) References Cited

U.S. PATENT DOCUMENTS 10,225,810 B2 3/2019 Ryu et al.
10,476,623 B2 11/2019 Ly et al.
(Continued)

FOREIGN PATENT DOCUMENTS

CN 114449528 5/2022
JP 2020-516182 5/2020
(Continued)

OTHER PUBLICATIONS

Oh et al., "Method and Device for Transmitting/Receiving Signal in Wireless Communication System", Apr. 4, 2024, WO, WO 2024071459 (Year: 2024).*

(Continued)

*Primary Examiner* — Michael K Phillips
(74) *Attorney, Agent, or Firm* — The Farrell Law Firm, P.C.

(57) ABSTRACT

Methods and apparatuses are provided in which a slot is generated including a symbol and a synchronization signal, which is transmitted through the symbol. The slot is transmitted to a reconfigurable intelligent surface (RIS) and a user equipment (UE). The symbol is used to determine an operation to be performed by the UE during a predetermined time period including the slot. The slot is transmitted to the UE through beams formed according to a first RIS pattern. A result of measuring each beam based on the beams is received from the UE. A second RIS pattern is determined for transmitting data based on the result of measuring each beam. A signal for controlling the first RIS pattern based on the second RIS pattern is transmitted to the RIS. A data signal is transmitted to the UE through the RIS. The second RIS pattern is applied to the RIS.

18 Claims, 13 Drawing Sheets

(51) Int. Cl.
  *H04J 13/00* (2011.01)
  *H04W 56/00* (2009.01)
(58) Field of Classification Search
  CPC .. H04B 7/0417; H04B 7/145; H04B 7/04013;
  H04J 13/0062; H04J 13/0025
  See application file for complete search history.

(56) References Cited

U.S. PATENT DOCUMENTS

| | | | |
|---|---|---|---|
| 11,522,648 B2 | 12/2022 | Kim et al. | |
| 2022/0322321 A1* | 10/2022 | Dai | H04W 72/51 |
| 2023/0030324 A1* | 2/2023 | Ali | H04B 7/04013 |
| 2023/0107283 A1 | 4/2023 | Park et al. | |
| 2023/0261708 A1 | 8/2023 | Jiang et al. | |
| 2024/0405842 A1* | 12/2024 | Sahraei | H04B 7/04026 |
| 2025/0062794 A1* | 2/2025 | Sahraei | H04L 25/0202 |
| 2025/0150118 A1* | 5/2025 | Ali | H04B 7/04013 |

FOREIGN PATENT DOCUMENTS

| | | |
|---|---|---|
| KR | 102192234 | 12/2020 |
| KR | 102409099 | 6/2022 |
| WO | WO 2017/091187 | 6/2017 |
| WO | WO 2021/172631 | 9/2021 |
| WO | WO 2021/221183 | 11/2021 |
| WO | WO 2022/049112 | 3/2022 |
| WO | WO 2022054985 | 3/2022 |
| WO | WO 2022/073161 | 4/2022 |
| WO | WO 2022/094905 | 5/2022 |
| WO | WO-2024071459 A1 * | 4/2024 | ............... H04B 7/06 |

OTHER PUBLICATIONS

Emil Bjornson et al., "Reconfigurable Intelligent Surfaces: A Signal Processing Perspective with Wireless Applications", Feb. 2021. (Year: 2021).*

Emil Bjornson et al., "Reconfigurable Intelligent Surfaces: A Signal Processing Perspective with Wireless Applications", Feb. 2021, 41 pages.

Mengnan Jian et al., "Reconfigurable Intelligent Surfaces for Wireless Communications: Overview of Hardware Designs, Channel Models, and Estimation Techniques", Mar. 2022, 20 pages.

International Search Report dated Jul. 6, 2023 issued in counterpart application No. PCT/KR2022/015730, 10 pages.

European Search Report dated Aug. 14, 2025 issued in counterpart application No. 22962827.6-1206, 8 pages.

* cited by examiner

* RP: reflection pattern, i.e., RIS beam

APPARATUS AND METHOD FOR PERFORMING BEAM SWEEPING USING RIS PATTERN IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0133248, filed on Oct. 17, 2022, in the Korean Intellectual Property Office, the disclosure of which is incorporated herein by reference in its entirety.

BACKGROUND

1. Field

The disclosure generally relates to a wireless communication system, and more particularly, to a method and an apparatus for performing beam sweeping by using a reconfigurable intelligent surface (RIS) reflection pattern.

2. Description of Related Art

Considering the developments in wireless communication, technologies have been developed mainly for services targeting humans, such as, for example, voice calls, multimedia services, and data services. Following the commercialization of 5th generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as, for example, augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as beyond-5G systems.

6G communication systems will have a peak data rate of tera (1,000 giga)-level bit per second (bps) and a radio latency less than 100 μsec, and thus will be 50 times as fast as 5G communication systems and have the $\frac{1}{10}$ radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (i.e., coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies, such as, for example, large-scale antennas. In addition, there has been ongoing discussion on new technologies for improving the coverage of terahertz-band signals, such as, for example, metamaterial-based lenses and antennas, orbital angular momentum (OAM), and reconfigurable intelligent surface (RIS).

In order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (e.g., mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as, for example, truly immersive extended reality (XR), high-fidelity mobile hologram, and digital replica could be provided through 6G communication systems. In addition, services such as, for example, remote surgery for security and reliability enhancement, industrial automation, and emergency response will be provided through the 6G communication system such that the technologies could be applied in various fields such as, for example, industry, medical care, automobiles, and home appliances.

In a wireless communication system, a base station may perform beam sweeping by using an RIS reflection pattern. More specifically, a method for performing synchronization and beam sweeping between a base station and a terminal, based on a signal regarding a RIS pattern transmitted by the base station, is being considered.

SUMMARY

Based on the above-described discussion, the disclosure provides an apparatus and a method for providing a service effectively in a wireless communication system.

More specifically, an apparatus and a method are provided for performing synchronization and beam sweeping between a base station and a terminal, based on a signal regarding a RIS pattern transmitted by the base station.

According to an embodiment, there is provided a method performed by a base station in a wireless communication system, the method including: generating at least one slot including at least one symbol and a synchronization signal, which is transmitted through the at least one symbol; transmitting, to a reconfigurable intelligent surface (RIS) and a user equipment (UE), the at least one slot including the at least one symbol, wherein the at least one symbol is used to determine an operation to be performed by the UE during a predetermined time period including the at least one slot; transmitting, to the UE, the at least one slot including the synchronization signal through one or more beams formed according to a first RIS pattern; receiving, from the UE, a result of measuring each beam based on the one or more beams formed according to the first RIS pattern; determining a second RIS pattern for transmitting data based on the result of measuring each beam; transmitting, to the RIS, a signal for controlling the first RIS pattern based on the determined second RIS pattern; and transmitting, to the UE, a data signal through the RIS, wherein the second RIS pattern is applied to the RIS.

According to an embodiment, there is provided a method performed by a terminal in a wireless communication system, the method including: receiving, from a base station, at least one slot including at least one symbol and a synchronization signal, which is transmitted through the at least one symbol, wherein the at least one symbol is used to determine an operation to be performed by the UE during a predetermined time section comprising the at least one slot; receiving, from the base station, the at least one slot including the synchronization signal through one or more beams formed according to an RIS pattern; measuring each beam based on the one or more beams formed according to the RIS pattern; transmitting a result of measuring each beam to the base station; and receiving, from the base station, a data signal through an RIS, wherein the RIS pattern determined based on the result of measuring each beam is applied to the RIS.

According to an embodiment, there is provided a base station in a wireless communication system, the base station including: at least one transceiver; and at least one processor functionally coupled with the at least one transceiver, wherein the at least one processor is configured to: generate at least one slot including at least one symbol and a synchronization signal, which is transmitted through the at least one symbol; transmit, to an RIS and a UE, the at least one slot including the at least one symbol, wherein the at least one symbol is used to determine an operation to be performed by the UE during a predetermined time period including the at least one slot; transmit, to the UE, the at least one slot including the synchronization signal through one or more beams formed according to a first RIS pattern; receive, from the UE, a result of measuring each beam based on the one or more beams formed according to the first RIS pattern; determine a second RIS pattern for transmitting data based on the result of measuring each beam; transmit, to the RIS, a signal for controlling the first RIS pattern based on the second RIS pattern; and transmit, to the UE, a data signal through the RIS, wherein the second RIS pattern is applied to the RIS.

According to various embodiments, there is provided a terminal in a wireless communication system, the terminal including: at least one transceiver; and at least one processor functionally coupled with the at least one transceiver, wherein the at least one processor is configured to: receive, from a base station, at least one slot including at least one symbol and a synchronization signal, which is transmitted through the at least one symbol, wherein the at least one symbol is used to determine an operation to be performed by the UE during a predetermined time section comprising the at least one slot; receive, from the base station, the at least one slot including the synchronization signal through one or more beams formed according to an RIS pattern; measure each beam based on the one or more beams formed according to the RIS pattern; transmit a result of measuring each beam to the base station; and receive, from the base station, a data signal from the base station through an RIS, wherein the RIS pattern determined based on the result of measuring each beam is applied to the RIS.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Terms herein are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the present disclosure.

In various embodiments of the disclosure described below, hardware-wise approach methods will be described by way of an example. However, various embodiments of the disclosure include technology using both hardware and software, and thus do not exclude software-based approach methods.

Terms indicating components of an apparatus (e.g., a control unit, a processor, a reflection element (RE)) used in the following descriptions, a term indicating an apparatus (e.g., an RIS), a term indicating data (e.g., a signal, feedback, a report, reporting, information, a parameter, a value, a bit, a codeword, etc.), a term indicating a concept of wireless communication (e.g., a channel, an artificial channel, a reflection pattern, a beam, etc.) are merely examples for convenience of explanation. Accordingly, the disclosure is not limited to the terms described below, and other terms having the same technical meanings may be used.

In addition, various embodiments are described by using terms used in some communication standards (e.g., 3$^{rd}$ generation partnership project (3GPP)), but this is merely an example for explanation. Various embodiments of the disclosure may be easily modified and applied to other communication systems.

Figure 1:
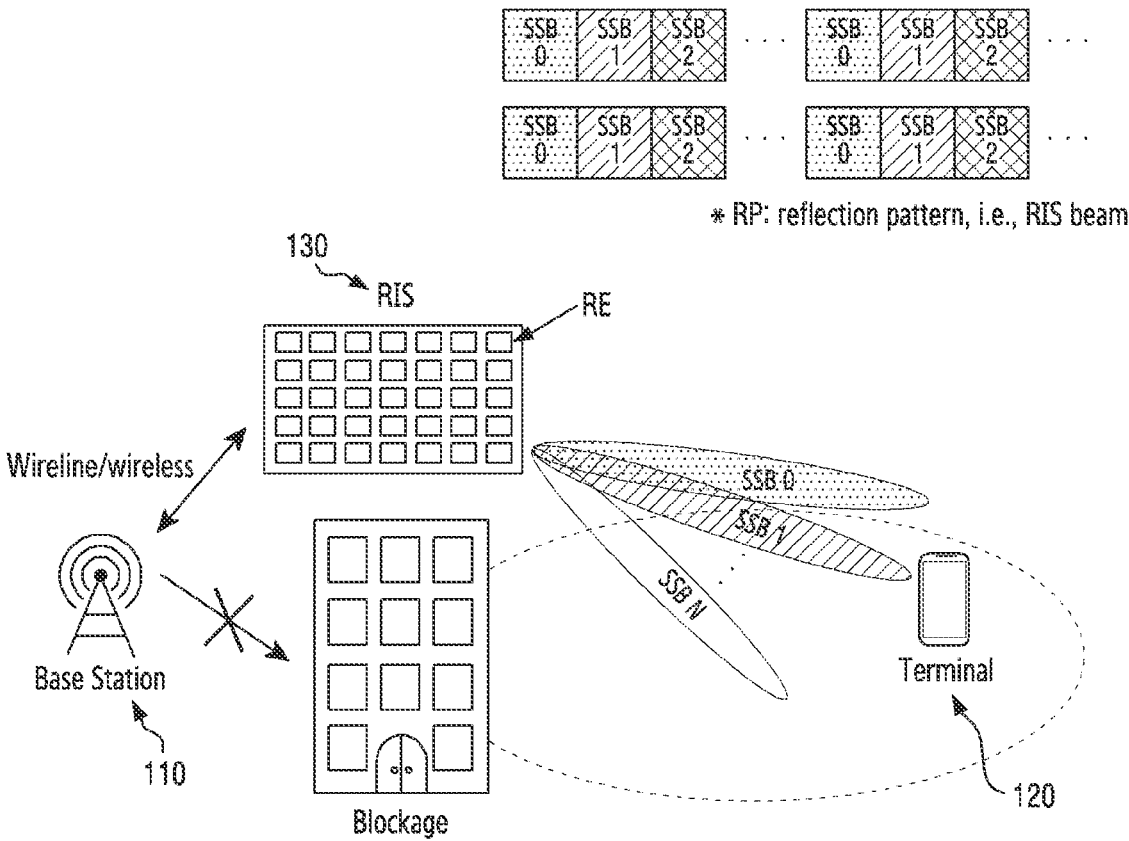
FIG. 1 is a diagram illustrating a wireless communication environment including an RIS in a wireless communication system, according to an embodiment.

FIG. 1 is a diagram illustrating a wireless communication environment including a RIS, according to an embodiment. FIG. 1 illustrates a base station 110, a terminal 120, and an RIS 130 as part of nodes using a wireless channel in a wireless communication system. FIG. 1 illustrates only one base station, but other base stations that are the same as or similar to the base station 110 may also be included. FIG. 1 illustrates only one RIS, but other RISs which are the same as or similar to the RIS 130 may also be included.

The base station 110 may be a network infrastructure that provides radio access to the terminal 120. The base station 110 may have a coverage that is defined as a predetermined geographical region based on a distance by which it transmits a signal. The base station 110 may be referred to as an access point (AP), an eNodeB, (eNB), a 5$^{th}$ generation (5G) node, a 6$^{th}$ generation (6G) node, a wireless point, a transmission/reception point (TRP), or other terms having the same technical meaning as the above-mentioned terms, in addition to the base station.

The terminal 120 is a device that is used by a user, and performs communication with the base station 110 through a wireless channel. In some cases, at least one of the terminals 120 may be operated without the user's intervention. That is, at least one of the terminals 120 may be a device that performs machine type communication (MTC), and may not be carried by a user. The terminal 120 may be referred to as user equipment (UE), a mobile station, a subscriber station, customer premises equipment (CPE), a remote terminal, a wireless terminal, an "electronic device, a user device, or other terms having the same technical meaning as the above-mentioned terms, in addition to the terminal.

The base station 110 and the terminal 120 may transmit and receive radio signals in a millimeter wave (mmWave) band (e.g., 28 GHz, 30 GHz, 38 GHz, 60 GHz, over 60 GHz, etc.). In this case, the base station 110 and the terminal 120 may perform beamforming in order to enhance a channel gain. Herein, beamforming may include transmission beamforming and reception beamforming. That is, the base station 110 and the terminal 120 may give directivity to a transmission signal or a reception signal.

Referring to FIG. 1, a signal that the base station 110 transmits to the terminal 120 may be reflected on the RIS 130 and may be transmitted to the terminal 120. Accordingly, the base station 110 may control at least one RIS reflection pattern to give direction to a signal transmitted to the terminal 120. A beamforming or beam management procedure that is performed by the base station 110 and the terminal 120 may include beamforming and beam management procedures which are performed between the base station 110 and the terminal 120 based on an RIS reflection pattern adjusted by the base station 110. In order to give direction to a signal in a beamforming environment in which beamforming is performed with beams reflected on the RIS 130, the base station 110 and the terminal 120 may select serving beams SSB 0, SSB 1, . . . , SSB N through a beam search or beam management procedure. After the serving beams SSB 0, SSB 1, . . . , SSB N are selected, communication may be performed through resources having a quasi co-located (QCL) relationship with resources through which the serving beams SSB 0, SSB 1, . . . , SSB N are transmitted. In addition, as shown in FIG. 1, there is an RIS reflection pattern corresponding to each serving beam, and accordingly, the signal transmitted by the base station 110 may include reflection patterns (RPs) mapped onto the serving beams SSB 0, SSB 1, . . . , SSB N, respectively.

When it is difficult for a specific terminal 120 to directly transmit and receive radio signals to and from the base station 110 due to an obstacle (e.g., a tree, a building, etc.) (e.g., when the terminal is located in shade), the terminal 120 may indirectly receive a signal transmitted from the base station 110 and reflected through the RIS 130. That is, the terminal 120 may receive a reflection signal reflected by the RIS 130. Herein, the RIS 130 may refer to a device that includes a plurality of reflection elements (REs). The RIS 130 may include a plurality of REs and an RIS controller (RC). The RIS 130 may be connected with the base station 110. For example, the RIS 130 may be wiredly connected with the base station 110. In addition, the RIS 130 may be wirelessly connected with the base station 110. The base station 110 may be wiredly or wirelessly connected with the RC included in the RIS 130, and may transmit a control signal for the RIS controller to control an RIS reflection pattern by using a RE.

Each RE of the RIS 130 may adjust a phase and an amplitude of a signal to reflect. For example, the RIS 130 may adjust a phase and an amplitude of a signal received from the base station 110 by a specific value, based on each RE. In this case, a combination of the phase and the amplitude of the signal to be adjusted by the specific value may be referred to as a reflection pattern. That is, the RIS 130 may adjust the phase and the amplitude of the signal received from the base station 110, based on the reflection pattern. The RIS controller which receives a control signal from the base station may control the reflection pattern of the RIS.

The RIS 130 may be operated based on a plurality of reflection patterns. For example, a first reflection pattern of the plurality of reflection patterns may be applied to the plurality of REs included in the RIS 130. The RIS 130 to which the first reflection pattern is applied may reflect a signal received from the base station 110 as a signal having a first reflection characteristic. Herein, reflecting as a signal having a reflection characteristic may refer to changing a characteristic of a received signal and reflecting the signal as it is, or generating a new signal based on the characteristic of the received signal and a reflection pattern to adjust (a reflection phase and a reflection amplitude) and transmitting the new signal. In addition, when a second reflection pattern, which is different from the first reflection pattern among the plurality of reflection patterns, is applied to the RIS 130, the second reflection pattern may be applied to the plurality of REs included in the RIS 130. In this case, the RIS 130 may reflect a signal that has a characteristic different from the signal reflected by the first reflection pattern. That is, the RIS 130 to which the second reflection pattern is applied may reflect a signal as a signal having the second reflection characteristic. The plurality of reflection patterns may be included in one RIS beam book.

The RIS 130 may determine a specific reflection pattern and a time during which the specific reflection pattern is maintained (hereinafter, referred to as a reflection pattern period) in order to reflect a signal received from the base station 110 and to transmit the signal to the terminal 120. The reflection pattern and the reflection pattern period of the RIS 130 may be configured from the base station 110. For example, the RIS 130 may receive configuration information from the base station 110 and may determine the reflection pattern and the reflection pattern period based on the configuration information. In addition, the RIS 130 may determine the reflection pattern and the reflection pattern period based on information on an electric wire (wired connection) connected from the base station 110. Herein, determining the reflection pattern may refer to selecting one of the reflection patterns of a specific RIS beam book and using the selected reflection pattern to reflect a signal. Accordingly, a signal that the base station transmits to the terminal or a signal that the terminal receives from the base station may include a signal that is transmitted from the base station and is transmitted to the terminal through a RIS reflection pattern.

As described above, the terminal 130 that is not able to directly receive a signal from the base station 110 due to an obstacle may maintain communication by receiving a signal reflected by the RIS 130. In addition, the base station may determine a reflection pattern of the RIS that reflects a signal transmitted to the terminal. The base station may perform beam sweeping by using at least one RIS pattern in order to efficiently transmit and receive signals by considering a beam direction or beamforming. However, the RIS pattern may be used for beamforming of the base station, and accordingly, an existing beam sweeping operation performed between the base station and the terminal by using SSB may degrade efficiency in terms of complexity, accuracy, or a delayed time. Accordingly, a method of transmitting and receiving signals for optimizing a beam sweeping operation when beamforming is performed by using a RIS pattern may be discussed.

Figure 2:
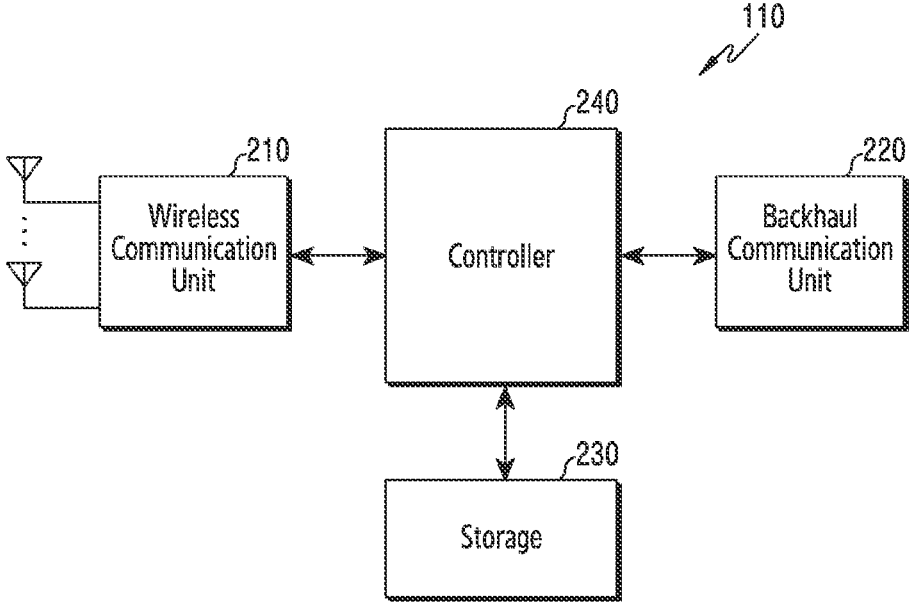
FIG. 2 is a diagram illustrating a functional structure of a base station in a wireless communication system, according to an embodiment.

FIG. 2 is a diagram illustrating a functional structure of a base station in a wireless communication system, according to an embodiment. The structure illustrated in FIG. 2 may be understood as a structure of the base station 110. The term "unit" or terms ending with suffixes "-er," and "-or" used herein refer to a unit processing at least one function or operation, and may be implemented by hardware, software, or a combination of hardware and software.

Referring to FIG. 2, the base station 110 may include a wireless communication unit 210, a backhaul communication unit 220, a storage 230, and a controller 240.

The wireless communication unit 210 performs functions for transmitting and receiving signals via a wireless channel. For example, the wireless communication unit 210 may perform a function of converting between a baseband signal and a bit stream according to a physical layer standard of a system. For example, when transmitting data, the wireless communication unit 210 may generate complex symbols by encoding and modulating a transmission bit stream. In addition, when receiving data, the wireless communication unit 210 may restore a reception bit stream by demodulating and decoding a baseband signal. In addition, the wireless communication unit 210 may up-convert a baseband signal into an RF band signal, and then may transmit the signal via an antenna, and may down-convert an RF band signal received via an antenna into a baseband signal.

To achieve this, the wireless communication unit 210 may include a transmission filter, a reception filter, an amplifier, a mixer, an oscillator, a digital to analog converter (DAC), an analog to digital converter (ADC), etc. In addition, the wireless communication unit 210 may include a plurality of transmission and reception paths. Furthermore, the wireless communication unit 210 may include at least one antenna array including a plurality of antenna elements. In the hardware aspect, the wireless communication unit 210 may be configured by a digital unit and an analog unit, and the analog unit may be configured by a plurality of sub-units according to operating power, an operating frequency, or the like.

The wireless communication unit 210 may transmit and receive signals. To achieve this, the wireless communication unit 210 may include at least one transceiver. For example, the wireless communication unit 210 may transmit a synchronization signal, a reference signal, system information, a message, control information, or data. In addition, the wireless communication unit 210 may perform beamforming.

The wireless communication unit 210 may transmit and receive signals as described above. Accordingly, an entirety or a part of the wireless communication unit 210 may be referred to as a transmitter, a receiver, or a transceiver. In addition, in the following description, transmitting and receiving via a wireless channel may be used as a meaning including processing by the wireless communication unit 210 as described above.

The backhaul communication unit 220 provides an interface for communicating with other nodes in a network. That is, the backhaul communication unit 220 may convert a bit stream to be transmitted from the base station 110 to another node, for example, another access node, another base station, a higher node, a core network, or the like, into a physical signal, and may convert a physical signal transmitted from another node into a bit stream.

The storage 230 may store data such as a basic program for operations of the base station 110, an application program, configuration information, or the like. The storage 230 may include a memory. The storage 230 may be configured by a volatile memory, a nonvolatile memory, or a combination of a volatile memory and a nonvolatile memory. In addition, the storage 230 provides stored data according to a request of the controller 240.

The controller 240 controls overall operations of the base station 110. For example, the controller 240 may transmit and receive signals via the wireless communication unit 210 or the backhaul communication unit 220. In addition, the controller 240 may write and read out data on and from the storage 230. In addition, the controller 240 may perform functions of a protocol stack required by communication standards. To achieve this, the controller 240 may include at least one processor.

The structure of the base station 110 illustrated in FIG. 2 is merely an example of a base station, and an example of a base station which performs various embodiments is not limited from the structure illustrated in FIG. 2. That is, according to various embodiments, some units may be added, deleted, or changed.

In FIG. 2, the base station is described as one entity, but the disclosure is not limited thereto. The base station may be implemented to form an access network that has not only an integrated deployment but also a distributed deployment. The base station may be divided into a central unit (CU) and a digital unit (DU), and may be implemented for the CU to perform an upper layer function (e.g., a packet data convergence protocol (PDCP), an RRC), and for the DU to perform a lower layer function (e.g., medium access control (MAC), physical (PHY)). In addition, the base station may further include a radio unit (RU) for processing an RF signal. The DU of the base station may form a beam coverage over a wireless channel.

Figure 3:
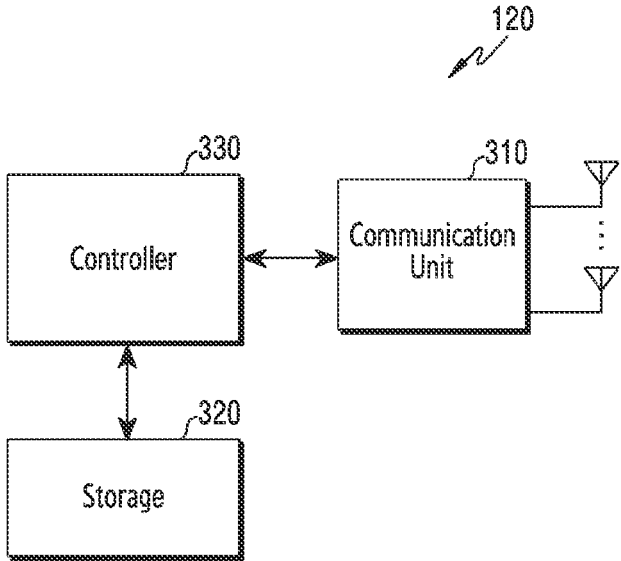
FIG. 3 is a diagram illustrating a functional structure of a terminal in a wireless communication system, according to an embodiment.

FIG. 3 is a diagram illustrating a functional structure of a terminal in a wireless communication system, according to an embodiment. The structure illustrated in FIG. 3 may be understood as a structure of the terminal 120. The term "unit" or terms ending with suffixes "-er," and "-or" used in the following description refer to a unit processing at least one function or operation, and may be implemented by hardware, software, or a combination of hardware and software.

Referring to FIG. 3, the terminal 120 may include a communication unit 310, a storage 320, and a controller 330.

The communication unit 310 performs functions for transmitting and receiving signals via a wireless channel. For example, the communication unit 310 may perform a function of converting between a baseband signal and a bit stream according to a physical layer standard of a system. For example, when transmitting data, the communication unit 310 may generate complex symbols by encoding and modulating a transmission bit stream. In addition, when receiving data, the communication unit 310 may restore a reception bit stream by demodulating and decoding a baseband signal. In addition, the communication unit 310 may up-convert a baseband signal into an RF band signal, and then may transmit the signal via an antenna, and may down-convert an RF band signal received via an antenna into a baseband signal. For example, the communication unit 310 may include a transmission filter, a reception filter, an amplifier, a mixer, an oscillator, a DAC, an ADC, etc.

In addition, the communication unit 310 may include a plurality of transmission and reception paths. Furthermore, the communication unit 310 may include an antenna unit. The communication unit 310 may include at least one antenna array including a plurality of antenna elements. In the hardware aspect, the communication unit 310 may be configured by a digital circuit and an analog circuit (e.g., a radio frequency integrated circuit (RFIC)). Herein, the digital circuit and the analogue circuit may be implemented as a single package. In addition, the communication unit 310 may include a plurality of RF chains. Furthermore, the communication unit 310 may perform beamforming. The communication unit 310 may apply a beamforming weight to a signal in order to give directivity to a signal to transmit or receive according to structure of the controller 330. The communication unit 310 may include an RF block (or RF unit). The RF block may include a first RF circuitry related to an antenna and a second RF circuitry related to baseband processing. The first RF circuitry may be referred to as an RF-antenna (RF-A). The second RF circuitry may be referred to as an RF-baseband (RF-B).

In addition, the communication unit 310 may transmit and receive signals. To achieve this, the communication unit 310 may include at least one transceiver. The communication unit 310 may receive a downlink signal. The downlink signal may include a synchronization signal (SS), a reference signal (RS) (e.g., a cell-specific reference signal (CRS), a demodulation (DM)-RS), system information (e.g., MIB, SIB, remaining system information (RMSI), other system information (OSI)), a configuration message, control information, or downlink data. In addition, the communication unit 310 may transmit an uplink signal. The uplink signal may include a random access-related signal (e.g., a random access preamble (RAP) (or message 1 (Msg1)), message 3 (Msg3)), a reference signal (e.g., a sounding reference signal (SRS), a DM-RS), or a power headroom report (PHR), etc.

In addition, the communication unit 310 may include different communication modules to process signals of different frequency bands. Furthermore, the communication unit 310 may include a plurality of communication modules to support a plurality of different radio access technologies. For example, the different radio access technologies may include Bluetooth low energy (BLE), wireless fidelity (Wi-Fi), WiFi gigabyte (WiGig), cellular network (e.g., long term evolution (LTE), new radio (NR)), etc. In addition, the different frequency bands may include a super high frequency (SHF) (e.g., 2.5 GH, 5 Ghz) band, a millimeter wave (e.g., 38 GHz, 60 GH, etc.) band. In addition, the communication unit 310 may use a radio access technology of the same scheme on different frequency bands (e.g., a unlicensed band for licensed assisted access (LAA), a citizens broadband radio service (CBRS) (e.g., 3.5 GHz)).

The communication unit 310 may transmit and receive signals as described above. Accordingly, an entirety or part of the communication unit 310 may be referred to as a transmitter, a receiver, or a transceiver. In addition, herein, transmitting and receiving via a wireless channel may be used as a meaning including processing by the communication unit 310 as described above.

The storage 320 may store data such as a basic program for operations of the terminal 120, an application program, configuration information, or the like. The storage 320 may be configured by a volatile memory, a nonvolatile memory, or a combination of a volatile memory and a nonvolatile memory. In addition, the storage 320 provides stored data according to a request of the controller 330.

The controller 330 controls overall operations of the terminal 120. For example, the controller 330 may transmit and receive signals via the communication unit 310. In addition, the controller 330 may write and read out data on and from the storage 320. In addition, the controller 330 may perform functions of a protocol stack required by communication standards. To achieve this, the controller 330 may include at least one processor. The controller 330 may include at least one processor or microprocessor, or may be a part of a processor. In addition, a part of the communication unit 310 and the controller 330 may be referred to as a communication processor (CP). The controller 330 may include various modules for performing communication. The controller 330 may control the terminal to perform operations according to various embodiments. The structure of the terminal 120 illustrated in FIG. 3 is merely an example of a terminal, and the example of the terminal which performs various embodiments of the disclosure is not limited from the structure illustrated in FIG. 3. That is, some units may be added, deleted, or changed.

Figure 4:
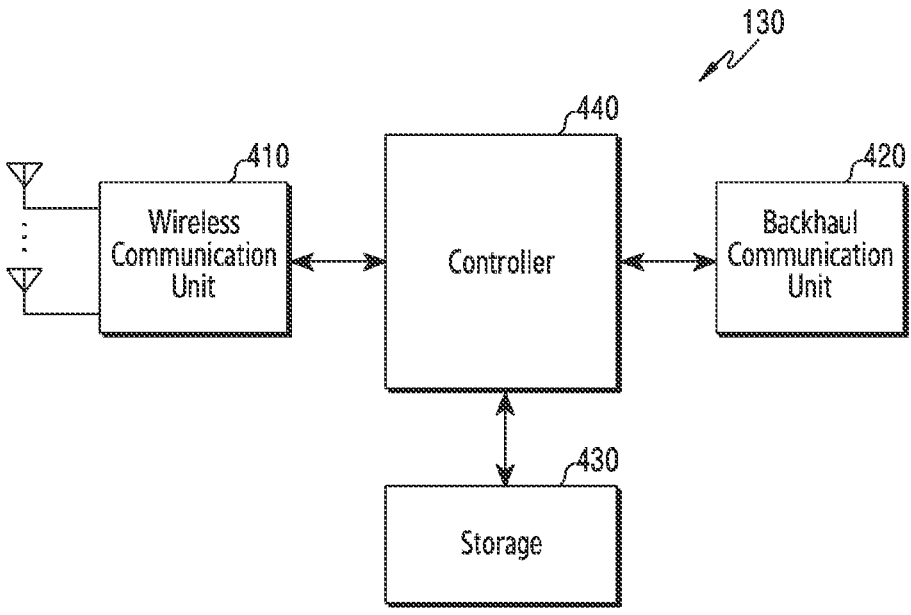
FIG. 4 is a diagram illustrating a functional structure of an RIS in a wireless communication system, according to an embodiment.

FIG. 4 is a diagram illustrating a functional structure of a RIS in a wireless communication system, according to an embodiment. The structure illustrated in FIG. 4 may be understood as a functional structure of a RIS controller included in the RIS. The structure illustrated in FIG. 4 may be understood as a structure of the RIS 130. The term "unit" or terms ending with suffixes "-er," and "-or" used in the following description refer to a unit processing at least one function or operation, and may be implemented by hardware, software, or a combination of hardware and software.

Referring to FIG. 4, the RIS 130 may include a wireless communication unit 410, a backhaul communication unit 420, a storage 430, and a controller 440.

The wireless communication unit 410 performs functions for transmitting and receiving signals via a wireless channel. For example, the wireless communication unit 410 may perform a function of converting between a baseband signal and a bit stream according to a physical layer standard of a system. For example, when transmitting data, the wireless communication unit 410 may generate complex symbols by encoding and modulating a transmission bit stream. In addition, when receiving data, the wireless communication unit 410 may restore a reception bit stream by demodulating and decoding a baseband signal. In addition, the wireless communication unit 410 may up-convert a baseband signal into an RF band signal, and then may transmit the signal via an antenna, and may down-convert an RF band signal received via an antenna into a baseband signal. The wireless communication unit 10 of the RIS 130 may receive a signal from the base station 110, and may reflect the received signal and may transmit the signal to the terminal 120. In addition, the wireless communication unit 410 of the RIS 130 may receive a signal from the terminal 120, and may reflect the received signal and may transmit the signal to the base station 110. In this case, the RIS 130 may reflect the received signal as it is, or may transmit a signal that is generated based on information on the received signal through the wireless communication unit 410. The RIS 130 may adjust a RIS reflection pattern based on a control signal received from the base station 110, and may reflect a received signal based on the adjusted RIS reflection pattern.

To achieve this, the wireless communication unit 410 may include a transmission filter, a reception filter, an amplifier, a mixer, an oscillator, a DAC, an ADC, etc. In addition, the wireless communication unit 410 may include a plurality of transmission and reception paths. Furthermore, the wireless communication unit 410 may include at least one antenna array including a plurality of antenna elements. In the hardware aspect, the wireless communication unit 410 may be configured with a digital unit and an analog unit, and the analog unit may be configured with a plurality of sub-units according to operating power, an operating frequency, etc.

In addition, the wireless communication unit 410 may include a plurality of REs. Based on the plurality of REs, the wireless communication unit 410 may reflect a signal. When a signal is reflected, an amplitude and a phase of the received signal may be adjusted by a specific value. A combination of an amplitude and a phase of a signal to be adjusted by the specific value may be referred to as a reflection pattern. Signal reflection, which is based on various reflection patterns, may include substantially the same or similar function as or to beamforming of the base station 110.

The wireless communication unit 410 may transmit and receive signals. To achieve this, the wireless communication unit 410 may include at least one transceiver. For example, the wireless communication unit 410 may transmit a synchronization signal, a reference signal, system information, a message, control information, or data. In addition, the wireless communication unit 410 may perform beamforming.

The wireless communication unit 410 may transmit and receive signals as described above. Accordingly, an entirety or a part of the wireless communication unit 410 may be referred to as a transmitter, a receiver, or a transceiver. In addition, in the following description, transmitting and receiving via a wireless channel may be used as a meaning including processing by the wireless communication unit 410 as described above.

The backhaul communication unit 420 provides an interface for communicating with other nodes in a network. That is, the backhaul communication unit 420 may convert a bit stream to be transmitted from the RIS 130 to another node, for example, another access node, a base station, a higher layer node, a core network, etc., into a physical signal, and may convert a physical signal received from another node into a bit stream. The RIS 130 may receive configuration information on a reflection pattern and a reflection pattern period from the base station 110 through the backhaul communication unit 420.

The storage 430 may store data such as a basic program for operations of the RIS 130, an application program, configuration information, or the like. The storage 430 may include a memory. The storage 430 may be configured by a volatile memory, a nonvolatile memory, or a combination of a volatile memory and a nonvolatile memory. In addition, the storage 430 provides stored data according to a request of the controller 440. The storage 430 may pre-store information regarding a plurality of reflection patterns applied to the RIS 130 (for example, a RIS beam book).

The controller 440 controls overall operations of the RIS 130. For example, the controller 440 may transmit and receive signals via the wireless communication unit 410 or the backhaul communication unit 420. In addition, the controller 440 may write and read out data on and from the storage 430. In addition, the controller 440 may perform functions of a protocol stack required by communication standards. To achieve this, the controller 440 may include at least one processor.

The structure of the RIS 130 illustrated in FIG. 4 is merely an example of a RIS, and an example of a RIS which performs various embodiments of the disclosure is not limited from the configuration illustrated in FIG. 4. That is, some configurations may be added, deleted, or changed.

Figure 5:
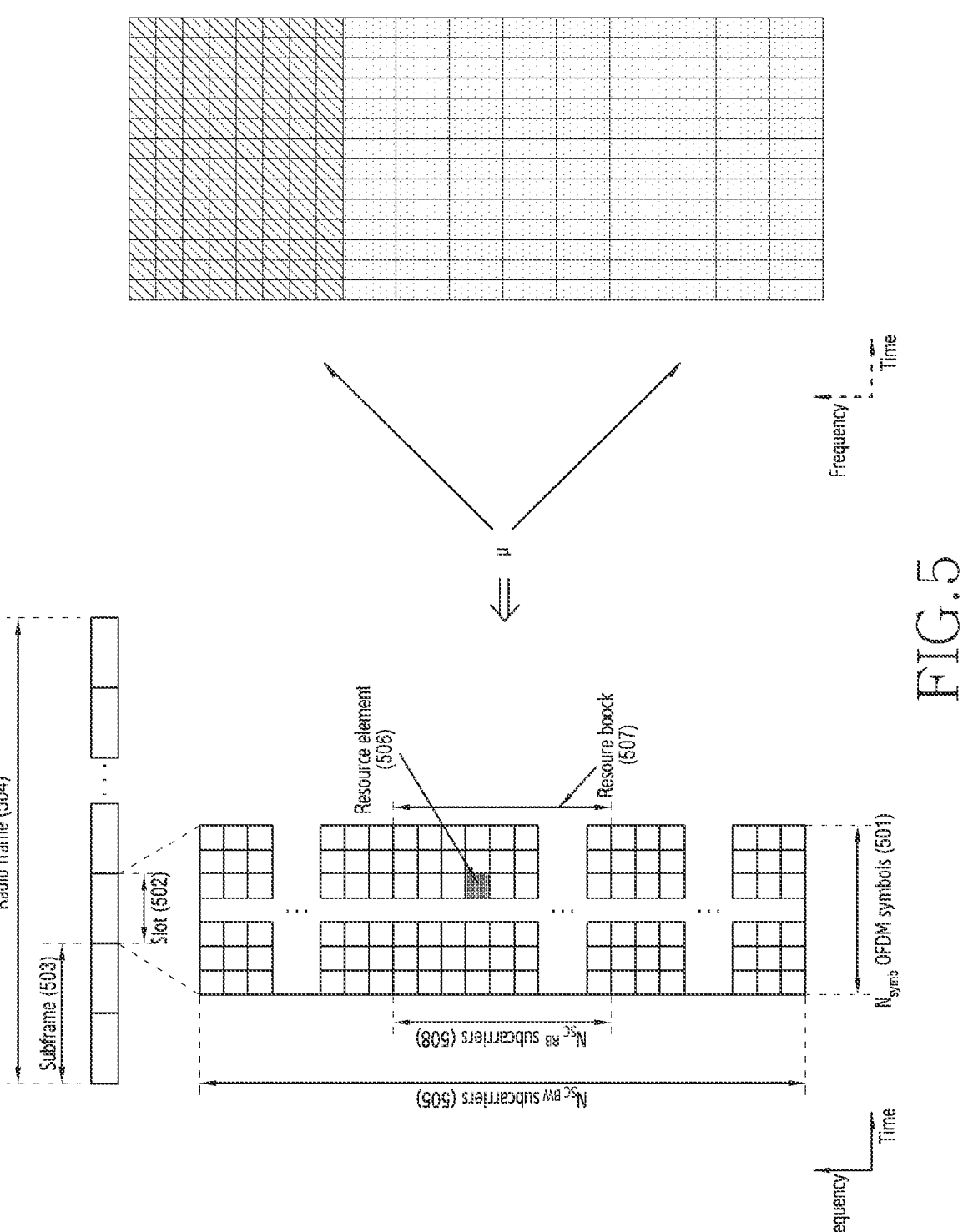
FIG. 5 is a diagram illustrating a radio resource domain in a wireless communication system, according to an embodiment.

FIG. 5 is a diagram illustrating a radio resource domain in a wireless communication system, according to an embodiment. The radio resource domain may include a structure of a time-frequency domain. The wireless communication system may include an NR communication system.

Referring to FIG. 5, the horizontal axis in the radio resource domain indicates a time domain and the vertical axis indicates a frequency domain. A radio frame 504 may be 10 ms long. The radio frame 504 may be a time domain section that includes 10 subframes. The subframe 503 may be 1 ms long. A configuration unit in the time domain may be an OFDM and/or discrete Fourier transform-spread-OFDM (DFT-s-OFDM) symbol, and Nsymb OFDM and/or DFT-s-OFDM symbols 501 may be collected, constituting one slot 502. The OFDM symbol may include a symbol regarding a case in which signals are transmitted and received by using an OFDM method, and the DFT-s-OFDM symbol may include a symbol regarding a case in which signals are transmitted and received by using a DFT-s-OFDM or single carrier frequency division multiple access (SC-FDMA) multiplexing method. A minimum transmission unit in the frequency domain may be a subcarrier and a carrier bandwidth constituting a resource grid may include NscBW subcarriers 505 in total. In addition, for convenience of explanation, an embodiment related to downlink signal transmission and reception is described herein, but the disclosure is applicable to an embodiment regarding uplink signal transmission and reception.

The number of slots 502 constituting one subframe 503 and a length of the slot 502 may vary according to subcarrier spacing. The subcarrier spacing may be referred to as numerology (µ). For example, the subcarrier spacing, the number of slots included in a subframe, a length of a slot, and a length of a subframe may be changeably configured. For example, when subcarrier spacing (SCS) in an NR communication system is 15 kHz, one slot 502 may constitute one subframe 503 and the slot 502 and the subframe 503 may be 1 ms long, respectively. In addition, for example, when subcarrier spacing is 30 kHz, two slots may constitute one subframe 503. In this case, the slot may be 0.5 ms long and the subframe may be 1 ms long.

Subcarrier spacing, the number of slots included in a subframe, a length of a slot, a length of a subframe may be changeably applied according to a communication system. For example, in the case of an LTE system, subcarrier spacing may be 15 kHz and two slots may constitute one subframe. In this case, the slot may be 0.5 ms long and the subframe may be 1 ms long. In another example, in the case of an NR system, subcarrier spacing (µ) may be one of 15 kHz, 30 kHz, 60 kHz, 120 kHz, 240 kHz, and the number of slots included in one subframe may be 1, 2, 4, 8, 16 according to the subcarrier spacing (µ).

A basic unit of resources in the time-frequency domain may be a resource element (RE) 506, and the RE 506 may be expressed by an OFDM symbol index and a subcarrier index. A resource block may include a plurality of REs. In an NR system, a resource block (RB) (or a physical resource block (PRB)) 507 may be defined as NSCRB continuous subcarriers in the frequency domain. The number of subcarriers NSCRB equals 12. The frequency domain may include common resource blocks (CRBs). In a bandwidth part (BWP) on the frequency domain, the PRB may be defined. CRB and PRB numbers may be determined differently according to subcarrier spacing. In an LTE system, the RB may be defined by Nsymb continuous OFDM symbols in the time domain and NSCRB continuous subcarriers in the frequency domain.

In the NR and/or LTE system, scheduling information on downlink data or uplink data may be transmitted from the base station 110 to the terminal 120 through downlink control information (DCI). The DCI may be defined according to various formats, and each format may indicate whether the DCI includes scheduling information (for example, a UL grant) on uplink data, whether the DCI includes scheduling information (for example, DL resource allocation) on downlink data, whether the DCI is compact DCI having control information of a small size, whether the DCI is fall-back DCI, whether spatial multiplexing using multi-antennas is applied, and/or whether the DCI is DCI for power control. For example, NR DCI format 1_0 or NR DCI format 1_1 may include scheduling regarding downlink data. In addition, for example, NR DCI format 0_0 or NR DCI format 0_1 may include scheduling regarding uplink data.

As described above, FIG. 5 illustrates an example of a downlink and uplink slot structures in a wireless communication system. In particular, FIG. 5 illustrates a structure of a resource grid in a 3GPP NR system. Referring to FIG. 5, a slot may include a plurality of OFDM symbols in the time domain, and may include a plurality of RBs in the frequency domain. A signal may be configured as a part or entirety of the resource grid. In addition, the number of OFDM symbols included in one slot may vary according to a length of a cyclic prefix (CP). In FIG. 5, it is illustrated that one slot includes 14 OFDM symbols for convenience of explanation, but a signal indicated in the disclosure does not specify a configuration of a symbol. In addition, a modulation scheme of a generated signal is not limited to quadrature amplitude modulation (QAM) of a specific value, and may include modulation schemes of various communication standards such as binary phase-shift keying (BPSK), quadrature phase shift keying (QPSK).

An operation for performing beam sweeping by using a RIS pattern is described based on an LTE communication system or an NR communication system, but contents of the disclosure are not limited thereto and may be applied to various wireless communication systems for transmitting downlink or uplink control information. In addition, the contents of the disclosure may be applied to an unlicensed band beside a licensed band when necessary.

The disclosure relates to a signal transmission method whereby higher layer signaling or higher signal is transmitted from the base station 110 to the terminal by using a downlink data channel of a physical layer, or a signal is transmitted from the terminal 120 to the base station 110 by using an uplink data channel of the physical layer. A signal that a base station transmits to a terminal may be transmitted through a RIS reflection surface. The higher layer signaling may include at least one of radio resource control (RRC) signaling, or signaling according to an F1 interface between a centralized unit (CU) and a distributed unit (DU), or a signal transmission method for transmitting through a media access control (MAC) control element (MAC CE). In addition, the higher layer signaling or higher signal may include system information that is transmitted to the plurality of terminals 120 in common, such as, for example, a system information block (SIB).

In a 5G wireless communication system, a synchronization signal block (SSB) (referred to as an SS block, an SS/PBCH block, etc.) may be transmitted for initial access, and the SSB may be configured with a primary synchronization signal (PSS), a secondary synchronization signal (SSS), a physical broadcast channel (PBCH). In addition, the SSB may include information regarding a beam that is used for the base station to transmit a signal. An SSB index or SSB described below may refer to at least one beam. At an initial access step at which a terminal accesses a system for the first time, the terminal may acquire downlink time and frequency domain synchronization from a synchronization signal through a cell search procedure. The synchronization signal may include a PSS and an SSS. The terminal may receive a PBCH including a master information block (MIB) from a base station, and may acquire system information related to transmission and reception, such as a system bandwidth or relevant control information, and a basic parameter value. The terminal may acquire a system information block (SIB) by performing decoding with respect to a physical downlink control channel (PDCCH) and a physical downlink shared channel (PDSCH), based on the received PBCH. Thereafter, the terminal may exchange an identity with the base station through a radon access step, and may initially access a network through steps of registration, authentication, etc.

As described above, one slot may include 14 symbols, and uplink-downlink configuration of a symbol and/or a slot in a 5G communication system may be configured by three steps.

In the first method, an uplink-downlink of a symbol and/or a slot may be configured based on cell-specific configuration information which is transmitted through system information in the unit of symbol semi-statically. More specifically, cell specific uplink-downlink configuration information which is transmitted through system information may include uplink-downlink pattern information and subcarrier information which is used as a reference. The uplink-downlink pattern information may indicate a pattern periodicity, the number of downlink slots continuous from a start point of each pattern, the number of symbols of the next slot, the number of uplink slots continuous from an end of the pattern, and the number of symbols of the next slot. A slot and a symbol that are not indicated as uplink slot or symbol and downlink slot and symbol may be determined as a flexible slot/symbol.

In the second method, through user-specific configuration information which is based on dedicated higher layer signaling, a flexible slot or a slot that includes a flexible symbol may be indicated by the number of downlink symbols continuous from a start symbol of each slot, and the number of uplink symbols continuous from an end of the slot, or may be indicated by a whole downlink of the slot or a whole uplink of the slot.

In the third method, in order to dynamically change a downlink signal transmission section and an uplink signal transmission section, it may be indicated whether symbols indicated as flexible symbols in each slot (for example, symbols that are not indicated by downlink symbols and uplink symbols) are downlink symbols or uplink symbols, or flexible symbols, through a slot format indicator (SFI) included in a downlink control channel. The slot format indicator may select one index from a table in which uplink-downlink configuration of 14 symbols in one slot is pre-configured (for example, 3GPP TS 38.213 Table 11.1.1-1).

Figure 6:
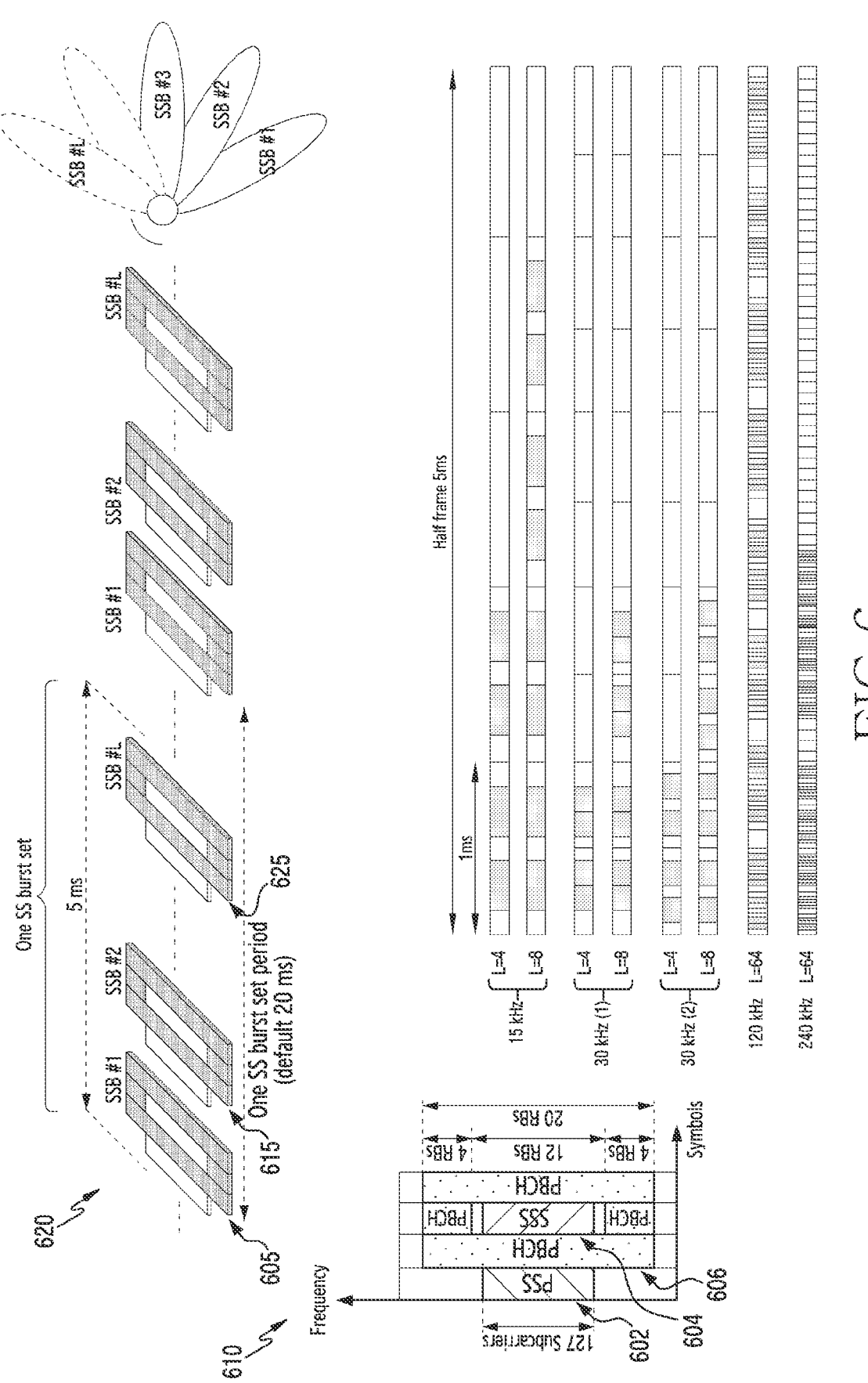
FIG. 6 is a diagram illustrating a time domain mapping structure of a synchronization signal and a beam sweeping operation in a new radio (NR) system, according to an embodiment.

FIG. 6 is a diagram illustrating a time domain mapping structure of a synchronization signal and a beam sweeping operation in an NR system, according to an embodiment.

Hereinafter, the following elements may be pre-defined.

Primary synchronization signal (PSS) 602: This element is a signal that is used as a reference for DL time/frequency synchronization, and may provide some information of a cell ID.

Secondary synchronization signal (SSS) 604: This element may be used as a reference for DL time/frequency synchronization, and may provide some other information of the cell ID. Additionally, this element may serve as a reference signal for demodulation of a PBCH.

Physical broadcast channel (PBCH) 606: This element may provide a master information block (MIB) which is essential system information necessary for transmission and reception through a data channel and a control channel of a terminal. The essential system information may include control information related to a search space, which indicates radio resource mapping information of the control channel, scheduling control information regarding a separate data channel for transmitting system information, information of a system frame number (SFN) which is a frame unit index used as a timing reference.

Synchronization signal (SS)/PBCH block (SSB) 605, 615, 625: The SS/PBCH block may be configured with N OFDM symbols, and may include a combination of the PSS, SSS, PBCH, etc. In the case of a system to which beam sweeping technology is applied, the SS/PBCH block may be a minimum unit for applying beam sweeping. In a 5G system, N=4.

Referring to FIG. 6, an example of one SS/PBCH block (SSB or SB is interchangeably used) is illustrated at 610. For example, in the case of a 5G system (NR system), the SS/PBCH block may include a PSS which occupies 127 subcarriers in the first OFDM symbol, an SSS which occupies 127 subcarriers in the third OFDM symbol, and a PBCH which occupies 240 subcarriers in the second and fourth OFDM symbols and occupies 48 subcarriers on each side of the SSS.

Referring to FIG. 6, an SSB burst set (which is interchangeably used with an SS burst set) including at least one SS/PBCH block is illustrated at 620. A base station may transmit a maximum of L SS/PBCH blocks, and the L SS/PBCH blocks may be mapped within a half frame (5 ms). The L SS/PBCH blocks may be periodically repeated in the unit of P (for example, 20 ms), which is a predetermined period. The number of SS/PBCH blocks (L) included in one SS/PBCH burst set may vary according to numerology. For example, when subcarrier spacing is 15 kHz as shown in FIG. 6, L per half frame may be 4 or 8, and, when subcarrier spacing in a higher frequency band (for example, FR 2) is 240 kHz, L per half frame may be 64. The base station may inform a terminal of the period P through signaling. When there is no separate signaling regarding the period P, the terminal may apply a pre-arranged default value.

FIG. 6 illustrates an example in which beam sweeping is applied in the unit of an SS/PBCH block with time at 620. Referring to FIG. 6, the terminal may receive the SS/PBCH block by using beams that are radiated in directions of SB #1 to SB #L by beamforming applied to SS/PBCH block #1 605 to block #L 625. The terminal may obtain an optimal synchronization signal through beams that are radiated from the base station in a direction toward a position of the terminal. For example, the terminal may have difficulty in acquiring time/frequency synchronization and essential system information from the SS/PBCH block through beams that are radiated in a direction far away from the position of the terminal. Based on the above-described contents, a beam may refer to an SS/PBCH block, and beam sweeping may include transmitting different SS/PBCH blocks in a time-multiplexed environment.

In order to determine whether radio link quality of a current cell is maintained at a predetermined level or higher, the terminal may receive the SS/PBCH block in other procedures than the initial access procedure. In addition, in a handover procedure of moving access from the current cell to an adjacent cell, the terminal may determine radio link quality of the adjacent cell, and may receive an SS/PBCH block of the adjacent cell to acquire time/frequency synchronization of the adjacent cell.

Based on the above-described contents, operations for performing beam sweeping by using a RIS pattern are described below. In a wireless communication environment in which a base station services a terminal in a shade through a RIS, the base station may control a RIS reflection pattern through L1 signaling or radio resource control (RRC) signaling. The base station may control the RIS reflection pattern to perform RIS beam sweeping. For example, the base station may already know specific reflection pattern information to apply at each time, and may transmit, to the terminal, one or more SSBs mapped onto at least one RIS beam corresponding to the specific reflection pattern. The terminal may detect a best SSB ID by calculating a signal strength of each SSB based on the received SSB, and may report a result of detecting to the base station. As a result, the base station may apply a RIS pattern corresponding to the SSB which is based on the result of detecting, and may transmit a data signal, thereby performing efficient communication using an optimal beam.

The base station may further transmit a signal regarding a RIS pattern, in addition to the signal including the SSB for synchronization and beam sweeping of the 5G system. The signal regarding the RIS pattern, which will be described in the disclosure, may include a signal that includes at least one slot, the at least one slot including a synchronization signal transmitted through at least one symbol generated by the base station, and the at least one symbol. The signal regarding the RIS pattern may have a structure that has complexity of time resources reduced, and may have a structural feature that it is transmitted per slot. Accordingly, when the base station applies the signal regarding the RIS pattern to a communication system like massive machine type communication (mMTC) or passive internet of things (IoT), in which data of a relatively low capacity is exchanged at low speed and low power and low complexity performance is required, the base station may perform more efficient signal transmission and reception. In addition, when the base station transmits the signal regarding the RIS pattern, the base station may be able to transmit a synchronization signal per slot. Accordingly, the method of transmitting the signal regarding the RIS pattern may be appropriate to an environment that requires time synchronization between different communication nodes like an unlicensed band communication system. Hereinafter, a configuration including a signal regarding a RIS pattern and operations of a base station, a RIS, and a terminal which perform beam sweeping based on the signal regarding the RIS will be described in detail.

Figure 7:
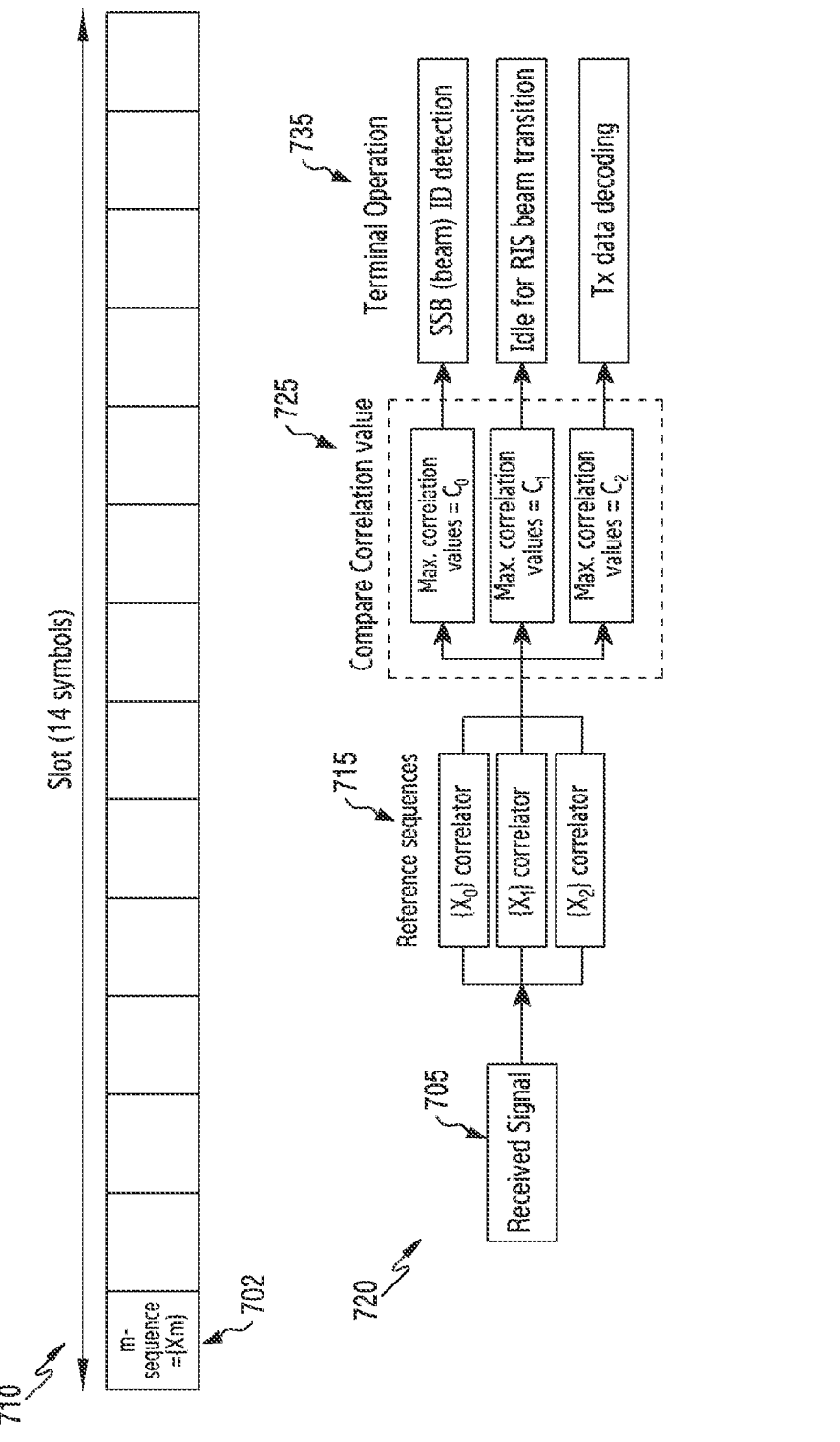
FIG. 7 is a diagram illustrating a slot structure included in a signal regarding an RIS pattern, according to an embodiment.

FIG. 7 is a diagram illustrating a slot structure included in a signal regarding a RIS pattern, according to an embodiment. Specifically, FIG. 7 illustrates an example of a slot structure included in a signal regarding a RIS pattern, which is transmitted by a base station. The slot structure disclosed in FIG. 7 is illustrated with reference to a time axis including slot and symbol units, but this should not be considered as limiting. The disclosure may include time division duplexing (TDD), frequency division duplexing (FDD), and does not preclude application to various communication systems including time division multiplexing (TDM), frequency division multiplexing (FDM), half duplex (HD), etc.

Referring to FIG. 7, the signal regarding the RIS pattern may include at least one slot including a plurality of symbols (e.g., 14 symbols) at 710. The at least one slot may include a resource element (RE) onto which a specific sequence is mapped at 702. The specific sequence may be mapped onto a predetermined number of resource elements of a frequency axis corresponding to one symbol included in the at least one slot. For example, a PSS in an NR system may have a PSS sequence mapped onto 127 resource elements, and the PSS sequence may be applied based on a basic 127-m-sequence. The terminal may search the sequence of the PSS which is based on the m-sequence, and may detect synchronization related to a period of the PSS. That is, the base station may perform synchronization with a terminal based on the PSS.

One or more symbols 702 included in the at least one slot may be mapped onto the m-sequence. The symbol 702 mapped onto the m-sequence may include information for time synchronization between the base station and the terminal, and an indication indicating a role of the at least one slot. The indication indicating the role of the slot may include at least one type of sequence among $\{X_0\}$, $\{X_1\}$, or $\{X_2\}$. The at least one slot of FIG. 7 is described with reference to the symbol mapped onto the m-sequence, but this should not be considered as limiting. The at least one slot may include a symbol that is mapped onto a sequence having an excellent auto correlation characteristic, such as a constant amplitude zero auto-correlation (CAZAC) sequence, a Zadoff-Chu sequence, a gold sequence, which performs substantially the same or similar function as or to that of the in-sequence.

Referring to FIG. 7, the at least one slot may include the symbol 702 that is mapped onto the in-sequence (for example, $\{X_m\}$). The symbol 702 mapped onto the in-sequence includes information regarding time synchronization, and accordingly, the terminal which receives the at least one slot from the base station may acquire time synchronization with the base station based on the symbol 702. In addition, the symbol 702 may include an indication indicating the role of the at least one slot, and the terminal which receives the at least one slot from the base station may identify the role of the at least one received slot based on the symbol 702.

When the symbol 702 is mapped onto the $\{X_0\}$ sequence of the in-sequence, the at least one slot may have a role of instructing the terminal to detect an SSB ID. The symbol 702 may include information instructing the at least one slot to detect the SSB ID. For example, the terminal which receives the at least one slot including the symbol mapped onto the $\{X_0\}$ sequence may perform an operation of detecting the SSB ID. The operation of detecting the SSB ID by the terminal may include an operation of detecting information related to the SSB ID included in the at least one slot. The SSB ID detected by the terminal may include at least one of an SS/PBCH block index, information regarding a RIS pattern, and a RIS pattern index. When the at least one slot includes the symbol mapped onto the $\{X_0\}$ sequence, the terminal may identify an index of a beam through which a signal including the at least one slot is transmitted (for example, may identify a RIS pattern in which the signal including the at least one slot is reflected) by using the other resources of the at least one slot, and may measure beams (for example, may measure reference signals received power (L1-RSRP)) based on the received signal.

When the symbol 702 is mapped onto the $\{X_1\}$ sequence of the m-sequence, the at least one slot may have a role of indicating that the at least one slot is a slot for RIS beam conversion. The symbol 702 may include information indicating that the at least one slot is a slot for RIS beam conversion. For example, the terminal which receives the at least one slot including the symbol mapped onto the $\{X_1\}$ sequence may identify that the at least one slot is a slot for converting a RIS reflection pattern, and may not be required to perform any terminal operation and may go into an idle mode.

When the symbol 702 is mapped onto the $\{X_2\}$ sequence of the in-sequence, the at least one slot may have a role of indicating that the at least one slot is a slot for data transmission. The symbol 702 may include information indicating that the at least one slot is a slot for data transmission. For example, the terminal which receives the at least one slot including the symbol mapped onto the $\{X_2\}$ sequence may identify that the at least one slot is a slot for data transmission. When the at least one slot includes the symbol mapped onto the $\{X_2\}$ sequence, the terminal may perform data decoding by using the other resources of the at least one slot. The other resources of the at least one slot through which the terminal performs data decoding may include data information or information of a demodulate reference signal (DMRS) for decoding. Before the terminal receives the symbol mapped onto the $\{X_2\}$ sequence, the base station may transmit the at least one slot including the symbol mapped onto the $\{X_1\}$ sequence, and accordingly, the base station may transmit a signal including the symbol mapped onto the $\{X_2\}$ sequence, and a data symbol, based on a converted RIS pattern.

A signal 705 that the terminal receives from the base station may include signals mapped onto different sequences or synchronization signals to which different cyclic shifts (CS) are applied. For example, a signal mapped onto the $\{X_0\}$ sequence may be a synchronization signal to which the CS is applied according to an equation of $X_0(n)=X(n)$. In addition, a signal mapped onto the $\{X_1\}$ sequence may be a synchronization signal to which the CS is applied according to an equation of $X_1(n)=X(n+43 \bmod 127)$, and a signal mapped onto the $\{X_2\}$ sequence may be a synchronization signal to which the CS is applied according to an equation of $X_2(n)=X(n+86 \bmod 127)$.

The terminal may receive a signal from the base station through an RIS 705, and the received signal may include a reference sequence 715. The reference sequence may include at least one of a $\{X_0\}$ correlator, a $\{X_1\}$ correlator, or a $\{X_2\}$ correlator. The terminal may compare correlation coefficients of the reference sequences (725), and may identify a maximum correlation value and may identify time synchronization with the base station and a role of a signal.

According to various embodiments of the disclosure, a structure in which a symbol of at least one slot included in a signal transmitted from the base station to the terminal is mapped onto the in-sequence is illustrated. However, this is merely an example, and the at least one slot may include a symbol that is mapped onto a certain sequence having an excellent auto correlation characteristic, and accordingly, a role of the slot indicated by each sequence or an operation of the terminal may be changeable. For example, it is important that the structure of the at least one slot illustrated in FIG. 7 includes a variety of information for enabling the terminal to acquire time synchronization and to identify a role of at least one slot, and a method for mapping such information or a specific structure of the slot may be implemented variously without departing from the scope of a function.

Figure 8:
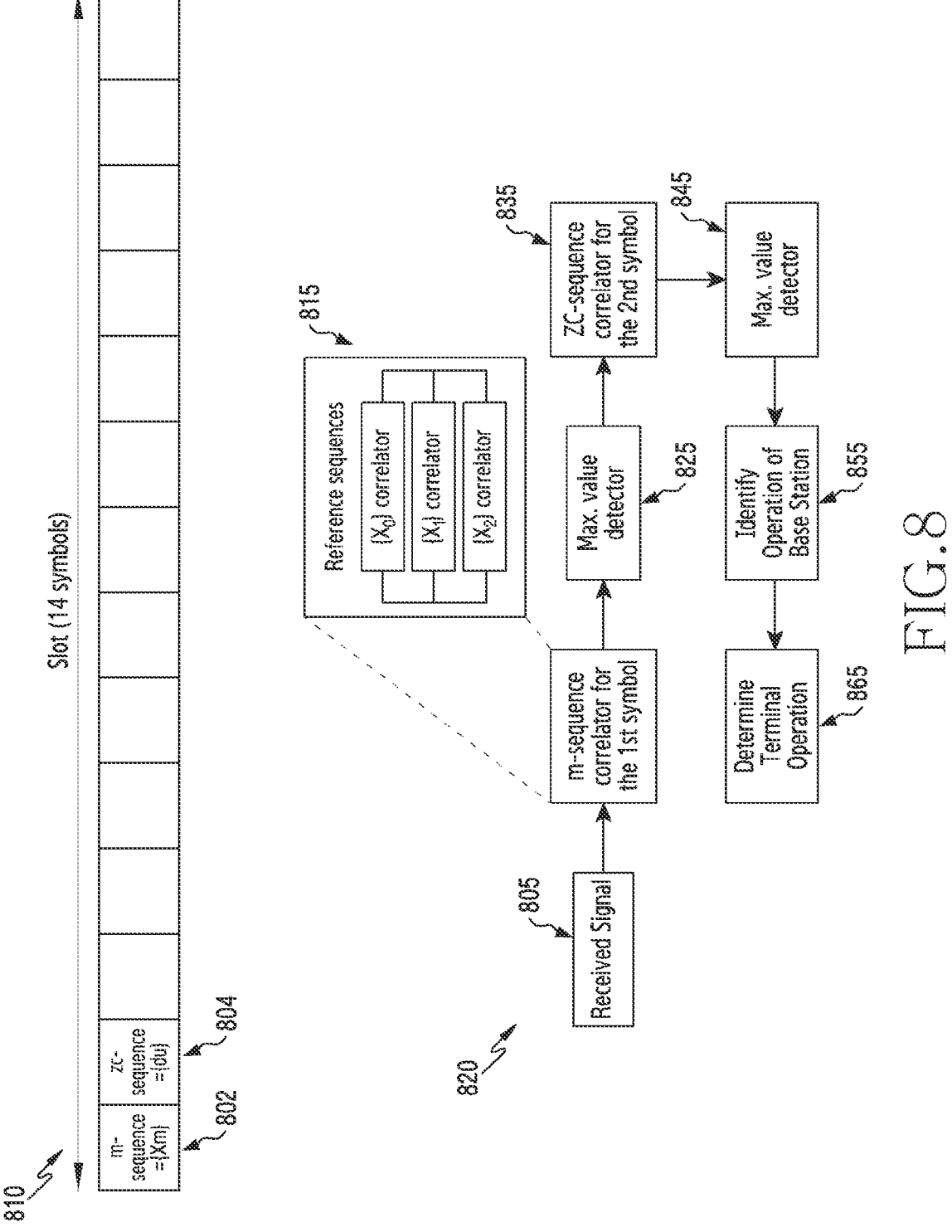
FIG. 8 is a diagram illustrating a slot structure included in a signal regarding an RIS pattern, according to an embodiment.

FIG. 8 is a diagram illustrating a slot structure included in a signal regarding a RIS pattern, according to another embodiment. Specifically, in addition to the slot structure disclosed in FIG. 7, FIG. 8 illustrates an example of a slot structure included in a signal regarding a RIS pattern, which is transmitted by a base station. The slot structure disclosed in FIG. 8 is illustrated with reference to a time axis including slot and symbol units, but this should not be considered as limiting. The disclosure may include TDD, FDD, and does not preclude application to various communication systems including TDM, FDM, half duplex HD, etc. In addition, FIG. 8 illustrates a slot structure including a symbol 802 mapped onto the m-sequence disclosed in FIG. 7, but this should not be considered as limiting, and at least one symbol 810 may include only a symbol 804 except for the symbol 802.

Referring to FIG. 8, the signal regarding the RIS pattern may include at least one slot including a plurality of symbols (e.g., 14 symbols) 810. The at least one slot may include a resource element (RE) onto which a specific sequence is mapped 802, 804. The specific sequence may be mapped onto a predetermined number of resource elements of a frequency axis corresponding to one symbol included in the at least one slot. For example, a PSS sequence of an LTE system may be applied based on a basic Zadoff-Chu sequence.

One or more symbols 804 included in the at least one slot may be mapped onto Zadoff-Chu sequences. The symbol 804 mapped onto the Zadoff-Chu sequence may include information of at least one beam that the base station transmits through the RIS. The at least one beam is transmitted by at least one RIS pattern, and accordingly, may correspond to the at least one RIS pattern. The information of the at least one beam may include an SSB ID (or index) or a beam ID (or index). The information of the at least one beam may include information resulting from encoding of the SSB ID by CS. The at least one slot of FIG. 8 is described with reference to the symbol 804 which is mapped onto the Zadoff-Chu sequence, but this should not be considered as limiting, and the at least one slot may include a symbol that is mapped onto a sequence having an excellent auto correlation characteristic, such as a CAZAC sequence, a 127-m-sequence, a gold sequence, which performs substantially the same or similar function as or to that of the Zadoff-Chu sequence.

Referring to FIG. 8, the at least one slot may include the symbol 804 which is mapped onto the Zadoff-Chu sequence. The symbol 804 which is mapped onto the Zadoff-Chu sequence includes information on a beam index (for example, an SSB index or a RIS pattern index), and accordingly, the terminal which receives the at least one slot from the base station may identify a beam index of a signal (for example, including an SSB index or a RIS pattern index) which is transmitted through the at least one received slot, based on the symbol 804.

According to an embodiment, when the symbol 804 is mapped onto the Zadoff-Chu sequence, the terminal may identify a beam index that is encoded by using CS included in the symbol 804. The terminal may measure beams of the signal based on the identified beam index, and may report a result of measuring beams to the base station.

The structure in which the symbol 804 is mapped onto the Zadoff-Chu sequence is described in greater detail below. For example, when 960 resource elements are scheduled for the symbol 804, the symbol 804 may be mapped with a beam index by using a length 960 ZC sequence. In this case, when one of 10 beam indexes is mapped, CS intervals may be 96 (960/10=96) in order to identify the 10 beam indexes. According to an embodiment, the Zadoff-Chu sequence may be applied to the symbol 804 by using one of different root indexes. The different root indexes may include one of $$\left\{ d_{25}(n), d_{29}(n), d_{34}(n) \left( \text{where } d_u(n) = \left\{ \begin{array}{l} e^{-j\frac{\pi u n(n+1)}{63}} \\ e^{-j\frac{\pi u(n+1)(n+2)}{63}} \end{array} \right\} \right) \right\},$$

and is not limited thereto, and may additionally include various root indexes.

The terminal may identify the beam index of the signal including the at least one slot, based on the one symbol 804 included in the at least one received slot. For example, a basic sequence corresponding to u which is a specific root index mapped onto the symbol 804 may be expressed by $$x_u(i) = e^{-j\frac{\pi u i(i+1)}{N_{ZC}}},$$

i=0, 1, . . . , $N_{ZC}$−1 (u is a sequence number). In addition, based on the basic sequence, the Zadoff-Chu sequence may be expressed by $x_{u,v}(n)=x_u((n+C_v)\mod N_{zc})(C_v=vN_{CS}$, $N_{CS}$=CS interval). When the sequence mapped onto the symbol 804 is encoded according to an equation of CS value=$5N_{CS}$ and is transmitted, the terminal may acquire a sequence result expressed by $x_{u,5}(i)=x_u((i+5N_{CS})\mod N_{zc})$. As a result, the terminal may calculate a correlation between the symbol 804 of the at least one slot 810 included in the signal 805 received by the terminal, and the basic sequence, and may determine that the beam index of the signal including the at least one slot is 5, as a result of calculating.

The terminal may receive a signal from the base station through the RIS 805, and the received signal may include at least one symbol 802 which is mapped onto an m-sequence correlator in at least one slot 815. The terminal may compare correlation coefficients of the reference sequences, and may identify a maximum correlation value and may identify time synchronization with the base station and a role of the signal 825. In addition, the signal that the terminal receives may include one symbol 804 that is mapped onto a Zadoff-Chu sequence correlator within the at least one slot 835. The terminal may detect the one symbol 804 mapped onto the Zadoff-Chu sequence and may identify a peak value, and may identify a corresponding beam index based on the identified peak value. FIG. 8 illustrates that at least one slot the terminal receives includes the symbol 802 and the symbol 804, and the terminal decodes all of these symbols, but this should not be considered as limiting. Each symbol may independently exist in the at least one slot, and the terminal may perform only a separate operation corresponding to each symbol.

Based on the above-described operations, the terminal may identify a role of the at least one slot of the received signal and the beam index corresponding to the at least one slot, and may identify an operation of the base station based on the result of identifying 855. For example, the terminal may identify whether the base station converts the RIS or transmits data, based on the result of identifying. In addition, the terminal may determine an operation of the terminal based on the result of identifying 865. For example, the terminal may perform at least one of operations of detecting a beam index, entering an idle mode, or decoding data, based on information indicated by the at least one slot.

A structure in which a symbol of at least one slot included in a signal transmitted from the base station to the terminal is mapped onto the Zadoff-Chu sequence is illustrated. However, this is merely an example, and the at least one slot may include a symbol that is mapped onto a certain sequence having an excellent auto correlation characteristic, and accordingly, a role of the slot indicated by each sequence or an operation of the terminal may be changeable. For example, it is important that the structure of the at least one slot illustrated in FIG. 8 includes a variety of information for enabling the terminal to identify a beam index or a RIS pattern index based on a signal received from the base station through the RIS, and a method for mapping such information or a specific structure of the slot may be implemented variously without departing from the scope of a function.

The base station and the terminal may perform the operations of transmitting and receiving information for synchronizing and transmitting and receiving at least one slot and symbol in order to indicate an index on a beam (RIS pattern), regardless of transmission and reception of a synchronization signal (for example, an SS/PBCH block) of an NR system. A signal including at least one slot and symbol in order to indicate an index regarding a beam (RIS pattern) may refer to a signal regarding the RIS pattern. In addition, in order to identify an SSB index in the NR system, the terminal may be required to decode a DMRS sequence or a PBCH payload in a PBCH. Accordingly, the base station and the terminal may reduce complexity of a transceiver by transmitting and receiving a signal regarding a RIS pattern, and may transmit and receive a synchronization signal efficiently.

Figure 9:
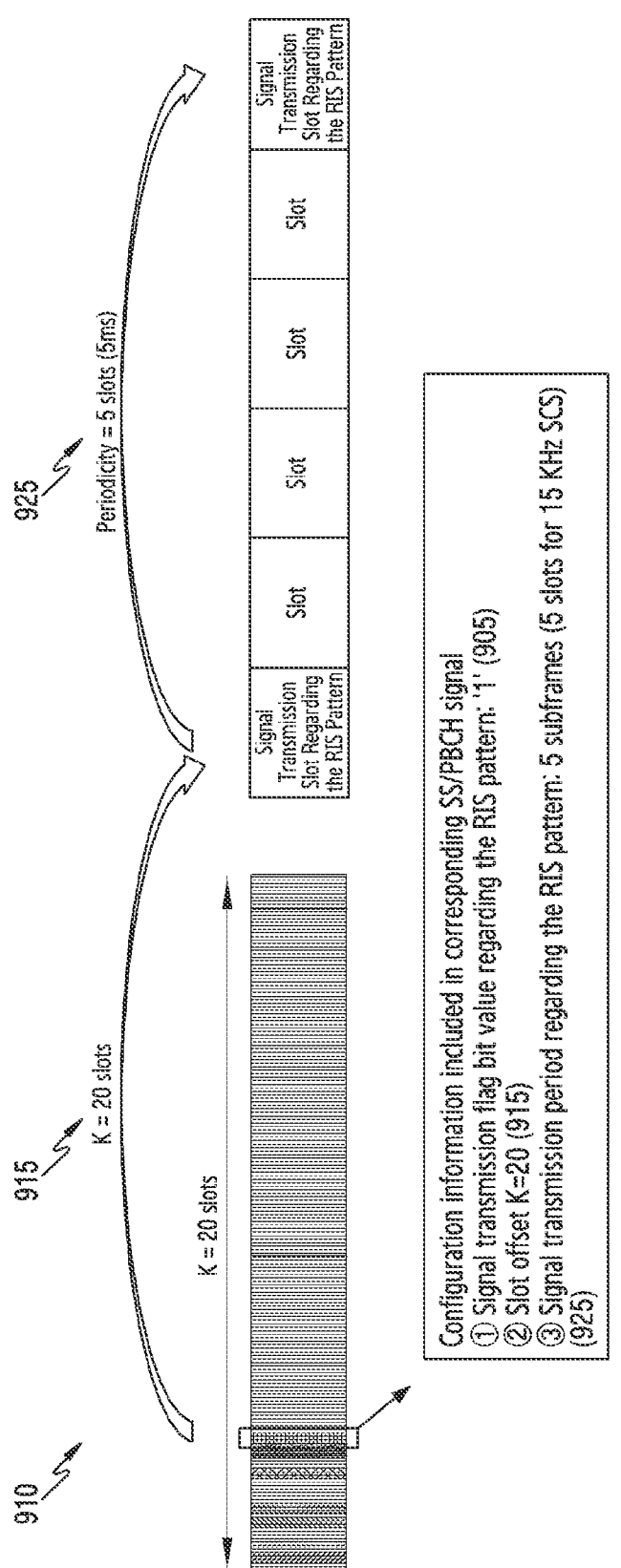
FIG. 9 is a diagram illustrating a resource structure for configuring a signal regarding an RIS pattern according to an embodiment.

FIG. 9 is a diagram illustrating a resource structure which configures a signal regarding a RIS pattern, according to an embodiment. Specifically, FIG. 9 illustrates a case in which the base station transmits a signal including an SS/PBCH block in addition to the slot structure disclosed in FIG. 7 or 8.

As described above with reference to FIGS. 6 to 8, the base station may indicate, to the terminal, an operation that is performed by the base station, based on at least one slot included in a synchronization signal (e.g., a signal regarding a RIS pattern) which is periodically transmitted to the terminal through the RIS. The base station may periodically transmit a signal including an SS/PBCH block of an NR system to the terminal, and simultaneously, may transmit a signal regarding a RIS pattern to the terminal every specific period (for example, on a slot or frame basis).

The SS/PBCH block that the base station transmits to the terminal may include information for indicating the signal regarding the RIS pattern. The information for indicating the signal regarding the RIS pattern may be a flag indicator that is indicated by 1 bit. The information for indicating the signal regarding the RIS pattern may be indicated through 1 bit L1 signaling (e.g., downlink control information (DCI)). In addition, the base station may pre-transmit configuration information for configuring the information for indicating the signal regarding the RIS pattern to the terminal through higher layer signaling (e.g., RRC signaling).

When there exists a RIS pattern signal indicator in the SS/PBCH block or the SS/PBCH block includes an indicator with a value of 1, the terminal which receives the SS/PBCH block including the information (e.g., the RIS pattern signal indicator) for indicating the signal regarding the RIS pattern may identify that the signal regarding the RIS pattern will be transmitted, and, when there does not exist the RIS pattern signal indicator or signaling is performed by a value of 0, the terminal may identify that the SS/PBCH block will be continuously transmitted without transmission of the signal regarding the RIS pattern. When the signal regarding the RIS pattern is transmitted, the SS/PBCH block may also be continuously transmitted along with the signal regarding the RIS pattern. Alternatively, only the signal regarding the RIS pattern may be transmitted without transmission of the SS/PBCH block. Accordingly, when the signal regarding the RIS pattern is transmitted from the base station, the terminal may further receive information regarding whether transmission of the SS/PBCH block is maintained.

The SS/PBCH block that the base station transmits to the terminal may include configuration information for configuring the signal regarding the RIS pattern. The configuration information for configuring the signal regarding the RIS pattern may include at least one of information regarding a slot offset or information regarding a transmission period of the signal regarding the RIS pattern. The transmission period of the signal regarding the RIS pattern may be indicated by using at least one of a system frame number (SFN), the number of subframes, or the number of slots. The terminal may pre-receive the configuration information for configuring the signal regarding the RIS pattern from the base station through higher layer signaling (for example, RRC signaling).

The SS/PBCH block that the terminal receives from the base station may include a value 905 indicating that a flag indicating the signal regarding the RIS pattern is set to 1, and the configuration information for configuring the signal regarding the RIS pattern may include a slot off set (K=20 slots) 915 and a value 925 of transmission period 5 subframes (5 slots in 15 kHz SCS). The terminal may identify that the signal regarding the RIS pattern is transmitted, based on the value 905 indicating that the flag is set to 1, and may identify that the signal regarding the RIS pattern is received after 20 slots. In addition, the terminal may identify that the signal regarding the RIS pattern is transmitted every 5 subframes (5 slots (5 ms) in 15 kHz SCS). When the signal regarding the RIS pattern overlaps the signal including the SS/PBCH block, the base station may have priority to transmit and receive the signal regarding the RIS pattern, and may transmit only the signal regarding the RIS pattern. When the terminal which receives the signal regarding the RIS pattern identifies that the flag value included in the SS/PBCH block is 0, the terminal may identify that transmission of the signal regarding the RIS pattern is finished.

Referring to FIG. 9, the terminal may identify what operation the base station performs in a corresponding slot without receiving a control signal (for example, DCI) through a separate control channel, by receiving the signal regarding the RIS pattern based on the SS/PBCH block, and may identify and perform a corresponding terminal operation. In addition, the terminal may perform a time synchronization process with the base station every slot, and simultaneously, may acquire information regarding operations of the base station and the RIS. Accordingly, by using the signal regarding the RIS pattern, the base station may transmit a signal for synchronizing every slot in order to perform timing synchronization even in a communication environment in which a frame structure (for example, an SFN, a subframe, etc.) is not standardized, like an existing NR system. In addition, the terminal may detect a sequence of the signal regarding the RIS pattern that is transmitted by the base station by applying one of N different CS candidates, through N multiple correlators, and may identify a sequence that has the greatest correlation value, and may perform only an essential operation corresponding thereto, thereby reducing calculation complexity of the terminal. For example, when a signal that the base station transmits to the terminal through the RIS is for data transmission, the terminal may identify such an operation of the base station and may perform only an operation for data decoding without performing other operations.

Figure 10:
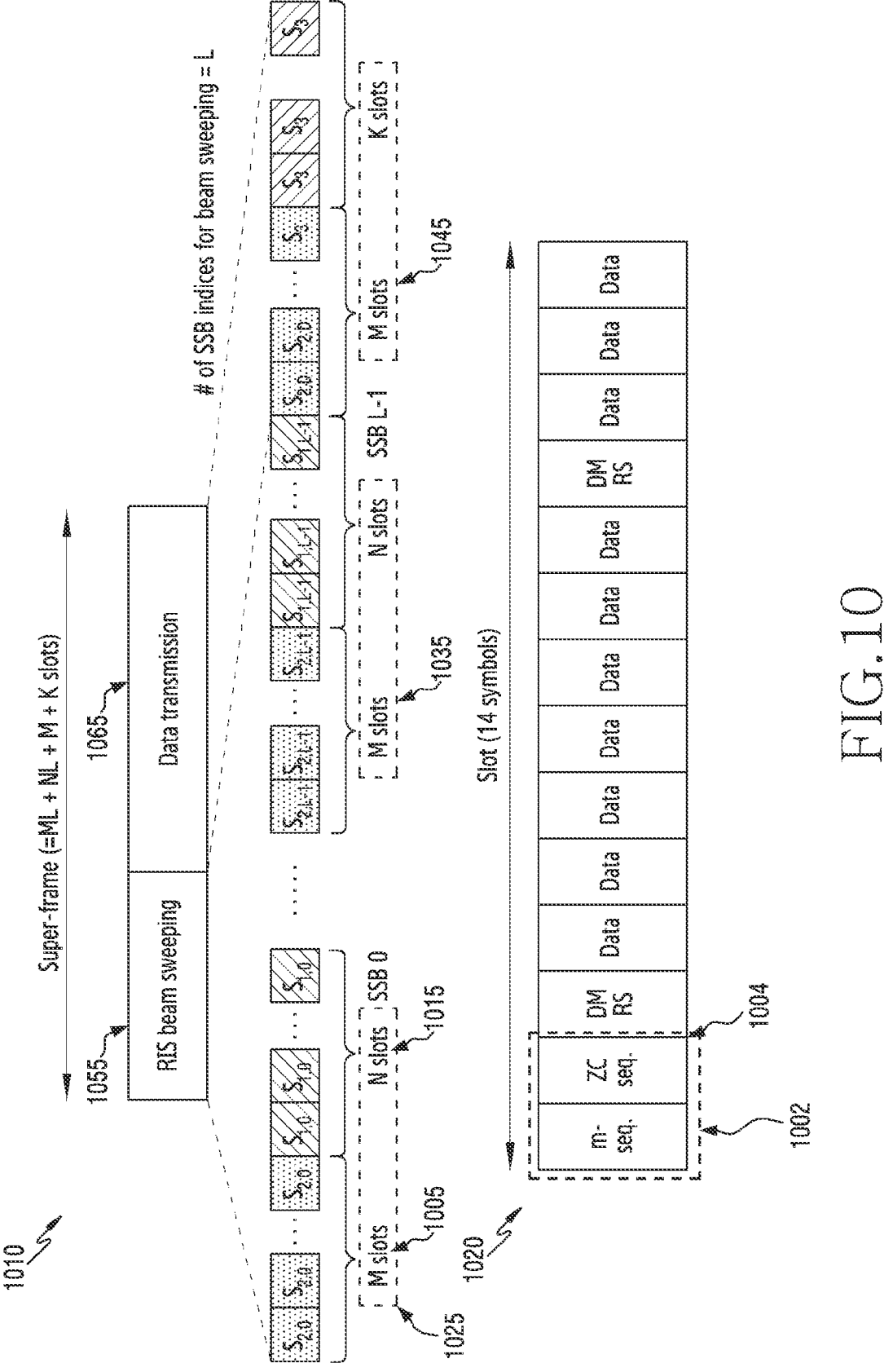
FIG. 10 is a diagram illustrating structures of a signal regarding an RIS pattern and a data signal, according to an embodiment.

FIG. 10 is a diagram illustrating structures of a signal regarding a RIS pattern and a data signal, according to an embodiment. Specifically, FIG. 10 illustrates a transmission structure including various embodiments according to FIGS. 6 to 9. However, this is merely an example, and all signals or symbols illustrated in FIG. 10 may not be included altogether, and may be independently configured.

Referring to FIG. 10, the terminal may receive a signal 1010 (e.g., a super frame) regarding a RIS pattern for beam sweeping according to a RIS pattern and data transmission or reception. The signal 1010 regarding the RIS pattern may include a section 1055 for RIS beam sweeping and a section 1065 for data transmission or reception.

The section 1055 for RIS beam sweeping may include slots for each beam index (SSB index or beam pattern index). For example, the section 1055 for RIS beam sweeping may include slots 1025 for SSB 0 to slots 1035 for SSB L. The slots for each beam index may include M slots 1005 for converting the RIS pattern and N slots 1015 for detecting the beam index. In addition, each slot may include the structure of the slot disclosed in FIG. 7 or 8. The base station may control the RIS to apply a reflection pattern corresponding to a beam index that the base station will transmit, and may transmit M slots ($S_{2,i}$) for converting the RIS pattern. The terminal may receive N slots ($S_{1,i}$) for detecting the beam index through the reflection pattern applied in the previous RIS pattern conversion section, and may detect the beam index and may measure an RSRP value for each beam index. The beam indexes may be transmitted in sequence from beam index 0 to beam index L−1.

Referring to FIG. 10, one slot ($S_{2,0}$) of the M slots 1005 for converting the RIS pattern may include a symbol 1002 that is mapped onto an m-sequence indicating that the slot is a slot for converting the RIS pattern, and a symbol 1004 that is mapped onto a Zadoff-Chu sequence indicating SSB 0 (beam index 0 or RIS pattern index 0). During this section, the base station may convert the reflection pattern of the RIS, and the terminal may identify the conversion of the reflection pattern and may enter an idle mode. Thereafter, the RIS pattern corresponding to the beam index 0 may be converted and the terminal may receive a signal based on the beam index 0.

One slot ($S_{1,0}$) of the N slots 1015 for detecting the beam index may include a symbol 1002 that is mapped onto an m-sequence indicating that the slot is a slot for detecting the beam index, and a symbol 1004 that is mapped onto a Zadoff-Chu sequence indicating SSB 0 (beam index 0 or RIS pattern index 0). During this section, the base station may transmits a signal corresponding to the beam index 0 to perform beam sweeping, and the terminal may identify the beam index 0 included in the signal and may measure beams based on the beam index 0.

Likewise, the same process may be performed with respect to other beam indexes. The terminal may receive a slot for RIS pattern conversion which corresponds to a beam index L−1, and may enter the idle mode. After RIS pattern conversion corresponding to the beam index L−1 is performed, the terminal may receive the slot for beam index detection which corresponds to the beam index L−1, and then, may identify the beam index L−1 and may measure beams based on the beam index L−1.

After the RIS beam sweeping section is ended, the base station may determine an optimal beam pattern (e.g., a beam index, an SSB index) based on a result of measuring beams of the terminal. The base station may apply information regarding the determined optimal beam pattern to a signal 1045 regarding the RIS pattern, and may transmit the same to the terminal for the sake of data transmission. The second 1065 for RIS data transmission may include slots corresponding to the optimal beam index. For example, the base station may control the RIS to apply an optimal reflection pattern for transmitting data, and may transmit M slots ($S_{2,D}$) for converting the RIS pattern. In addition, the base station may transmit K data slots ($S_3$) based on the applied reflection pattern.

The terminal may receive the slot for converting the RIS pattern, which corresponds to the beam index D determined as an optimal beam pattern, and may enter the idle mode. After RIS pattern conversion corresponding to the beam index D is performed, the terminal may receive the slot for data transmission or reception which corresponds to the beam index D, and then, may decode the data. FIG. 10 illustrates the section for data transmission right after beam sweeping for the beam index L−1, but this should not be considered as limiting, and a time section necessary for determining a beam measurement result between the base station and the terminal and an optimal beam may also be included.

More specifically, referring to FIG. 10, at least one slot included in the signal regarding the RIS pattern may include one or more symbols 1002, 1004 (1020). When the at least one slot is $S_{1,i}$, the at least one slot may mean detection of the beam index i (or data muting). In this case, the symbol 1002 may include the in-sequence of $\{X_0\}$, and the symbol 1004 may indicate that the CS value is $C_i$ (e.g., $C_i=iN_{CS}$). When the at least one slot is $S_{2,i}$, the at least one slot may mean RIS pattern conversion (or data muting). In this case, the symbol 1002 may include the in-sequence of $\{X_1\}$ and the symbol 1004 may include RIS pattern index information that the base station will apply. In addition, the base station may transmit the symbol 1004 to the RIS and may control the RIS reflection pattern. When the at least one slot is $S_3$, the at least one slot may mean data transmission based on the RIS pattern which is determined as the optimal beam.

The terminal may detect the in-sequence of the symbol 1002 among the symbols included in the at least one slot through the following operations. When the detected m-sequence is indicated by $\{X_0\}=X(n)(0\leq n<127)$, the terminal may determine a beam index by detecting a CS of the Zadoff-Chu sequence of the symbol 1004 among the symbols included in the at least one slot. When the detected in-sequence is indicated by $\{X_1\}=X(n+43 \bmod 127)$ $(0\leq n<127)$, the terminal may not perform the operation of detecting the CS of the Zadoff-Chu sequence of the symbol 1004 among the symbols included in the at least one slot. When the detected in-sequence is indicated by $\{X_2\}=X(n+ 86 \bmod 127)(0\leq n<127)$, the terminal may perform data decoding.

Figure 11:
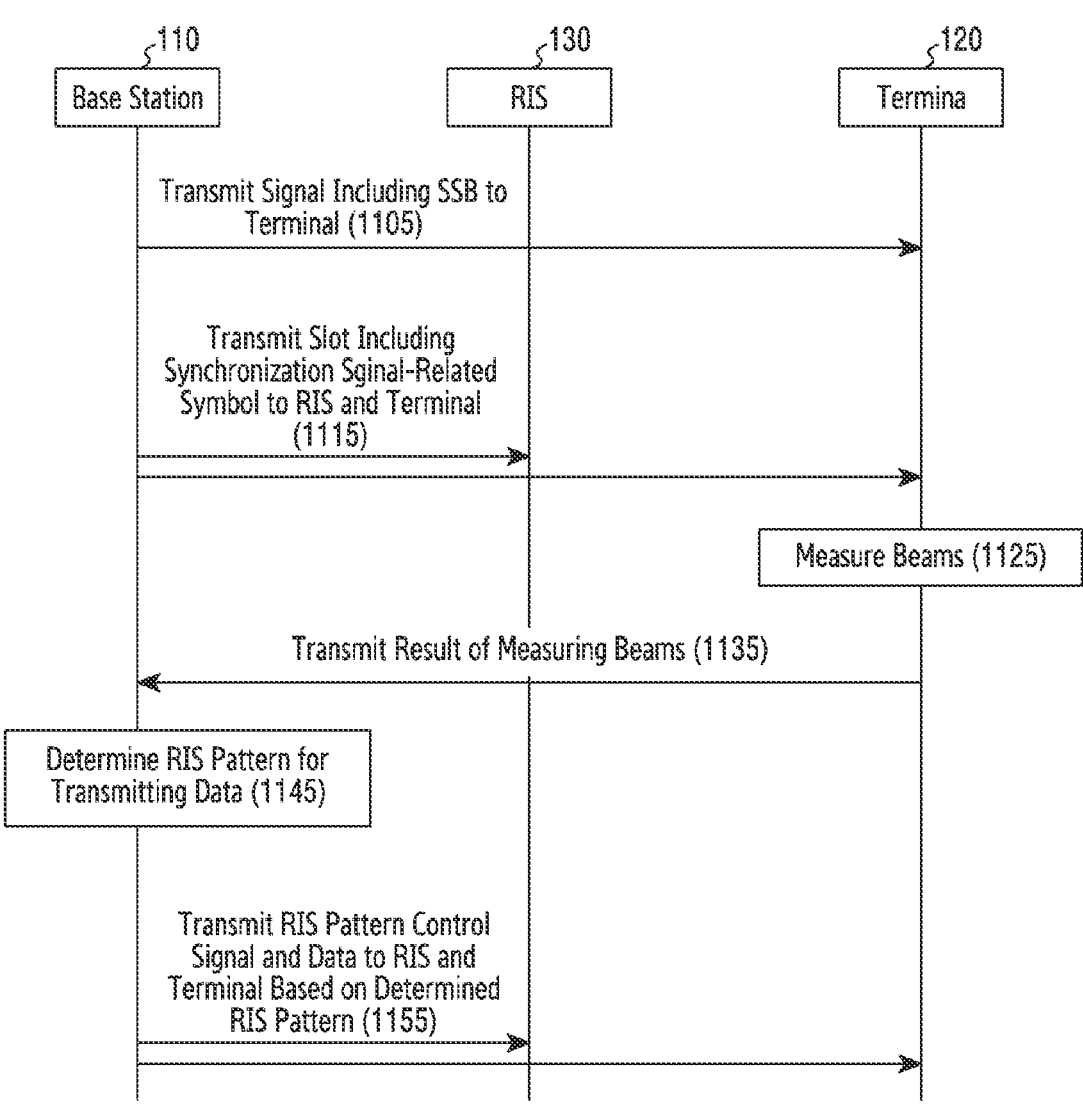
FIG. 11 is a diagram illustrating a flow of a signal for performing beam sweeping by using a RIS pattern, according to an embodiment.

FIG. 11 is a flowchart illustrating a method for performing beam sweeping by using a RIS pattern, according to an embodiment. Specifically, FIG. 11 illustrates a flow of a signal for performing beam sweeping based on a signal regarding a RIS pattern disclosed in FIGS. 6 to 10. However, this is merely an example. The signal regarding the RIS pattern may include the structure of the slot disclosed in FIG. 8, or may include only the structure of the slot disclosed in FIG. 7.

At 1105, the base station may transmit a signal including an SS/PBCH block to the terminal. For example, the base station may transmit a synchronization signal of an NR system (e.g., an SS/PBCH block including a PSS, an SSS and a PBCH) to the RIS or the terminal. The SS/PBCH block that the base station transmits may include the SS/PBCH disclosed in FIG. 9. Accordingly, the base station may periodically transmit the signal including the SS/PBCH block of the NR system to the terminal, and simultaneously, may transmit a signal regarding a RIS pattern to the terminal every specific period (for example, on a slot or frame basis). The SS/PBCH block that the base station transmits may include information for indicating the signal regarding the RIS pattern as described in detail with reference to FIG. 9. 1105 may not be an essential step, and the base station, the RIS and the terminal may perform other operations except for step 1105 and step 1105 may be omitted. The base station may omit step 1105 for the sake of synchronization signal transmission and beam sweeping.

At 1115, the base station may transmit a slot including a synchronization signal-related symbol to the RIS and the terminal. The base station may generate at least one slot including a synchronization signal transmitted through at least one symbol, and the at least one symbol, although this operation is not illustrated in FIG. 11. The base station may transmit the at least one generated slot including the at least one symbol to the RIS and the terminal. The at least one symbol may be used to determine an operation that should be performed by the terminal during a predetermined time period including the at least one slot. Specifically, a signal regarding at least one RIS pattern, which is transmitted from the base station to the terminal, may include the slot structure disclosed in FIGS. 7 to 10. The signal regarding the at least one RIS pattern which is transmitted by the base station may include a synchronization signal and at least one slot. For example, the signal regarding the at least one RIS pattern may include at least one of slots for converting the RIS pattern, slots for detecting a beam index, or slots for transmitting data. The slots included in the signal regarding the RIS pattern may be mapped onto beam indexes for beam sweeping. The terminal may acquire time synchronization with the base station, based on the received signal regarding the RIS pattern. The signal regarding the RIS pattern includes information regarding time synchronization, and accordingly, may be referred to as a synchronization signal. The roles of slots included in the signal regarding the RIS pattern or the mapped beam indexes have been described in FIGS. 7 to 10.

The RIS may convert the RIS pattern based on the signal regarding the RIS pattern received from the base station although this operation is not illustrated in FIG. 11. One symbol of symbols of at least one slot included in the signal regarding the RIS pattern may indicate that the slot is a slot for converting the RIS pattern, and, when another symbol includes a specific RIS pattern index (corresponding to a specific beam index), the RIS may perform RIS pattern conversion corresponding to the specific RIS pattern index. In this case, the terminal which receives the same signal regarding the RIS pattern may enter an idle mode.

At 1125, the terminal may measure beams based on the signal regarding the RIS pattern received from the base station. For example, the terminal may identify that at least one slot is a slot for detecting a beam index, based on one symbol of the symbols included in the at least one slot included in the signal regarding the RIS pattern, and may identify a beam index corresponding to the at least one slot based on another symbol. The terminal may measure beams based on the identified beam index. As a parameter used for measuring beams, reference signal received power (RSRP) may be normally used, but the parameter may include at least one of a received signal strength indicator (RSSI), reference signal received quality (RSRQ), a signal to interference noise ratio (SINR), a channel quality indicator (CQI), a modulation coding scheme (MCS), or a rank index (RI), and may further include substantially the same or similar parameter.

At 1135, the terminal may transmit a result of measuring beams to the base station. The terminal may receive signals transmitted according to RIS patterns in sequence according to beam indexes, and may report results of measuring beams to the base station.

At 1145, the base station may determine a RIS pattern for transmitting data. The base station may determine an optimal RIS pattern based on the results of measuring beams received from the terminal. The base station may generate a signal regarding the RIS pattern for transmitting data based on the determined RIS pattern. At least one slot included in the signal regarding the RIS pattern for transmitting data may include a symbol that is mapped onto the determined RIS pattern index and a symbol that indicates RIS pattern conversion. Alternatively, the at least one slot may include a symbol that indicates data decoding and symbols for transmitting data.

At 1155, the base station may transmit signals for controlling RIS patterns respectively, and a data signal to the RIS and the terminal. The base station may transmit the signal regarding the RIS pattern which is generated based on the determined RIS pattern to the RIS and the terminal. The RIS may receive the signal regarding the RIS pattern, and may convert the RIS pattern, based on the at least one slot including the symbol that is mapped onto the determined RIS pattern index and the symbol that indicates the RIS pattern conversion. In this case, the terminal which receives the same signal regarding the RIS pattern may enter the idle mode. When the RIS pattern is converted, the terminal may receive at least one slot for data decoding based on the converted RIS pattern (e.g., the determined RIS pattern), and may receive and decode the data based on the slot.

Through the above-described steps, the base station may transmit the synchronization signal having complexity reduced, and the signal for beam sweeping to the terminal, and may enable data signal transmission and reception to which the optimal beam or RIS reflection pattern is applied, based on the signals. However, this is merely an example, and some of the above-described steps may be omitted according to various embodiments. A symbol of a transmitted or received signal may have information elements mapped thereto through a certain sequence technique, or the structure of the slot may be modified as long as substantially the same or similar function is maintained.

Figure 12:
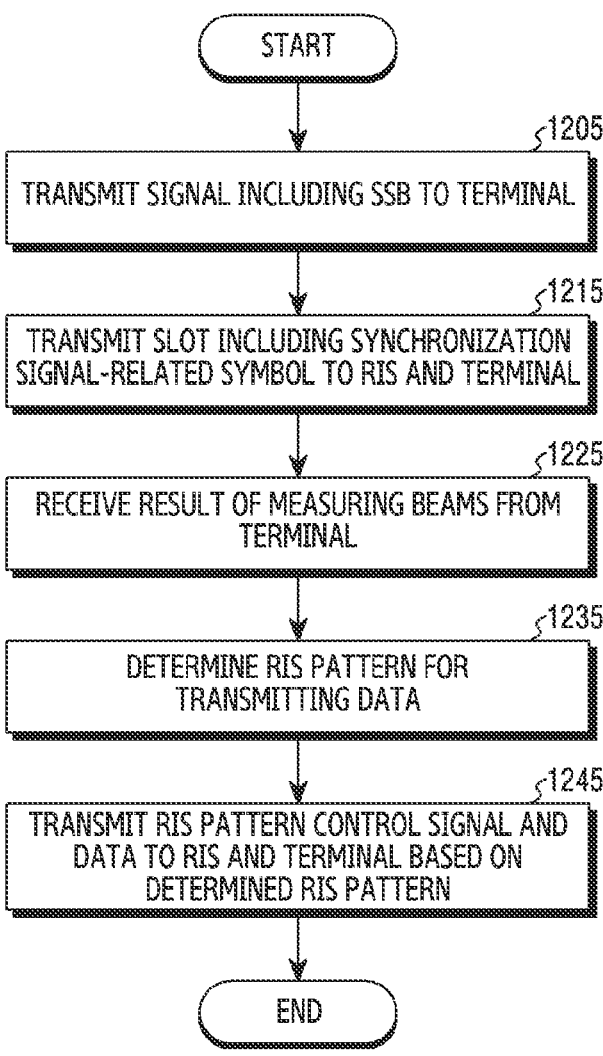
FIG. 12 is a flowchart illustrating a method for performing beam sweeping by using an RIS pattern in a base station, according to an embodiment.

FIG. 12 is a flowchart illustrating a method for performing beam sweeping by using a RIS pattern in a base station, according to an embodiment. Specifically, FIG. 12 illustrates an operation flow of the base station for performing beam sweeping based on the signal regarding the RIS pattern, which is disclosed in FIGS. 6 to 10. However, this is merely an example, and the signal regarding the RIS pattern may include the structure of the slot disclosed in FIG. 8, or may include only the structure of the slot disclosed in FIG. 7.

At 1205, the base station may transmit a signal including an SS/PBCH block to the terminal. For example, the base station may transmit a synchronization signal (e.g., an SS/PBCH block including a PSS, an SSS and a PBCH) of an NR system to the RIS or the terminal. The SS/PBCH block that the base station transmits may include the SS/PBCH disclosed in FIG. 9. Accordingly, the base station may periodically transmit the signal including the SS/PBCH block of the NR system to the terminal, and simultaneously, may transmit a signal regarding a RIS pattern to the terminal every specific period (for example, on a slot or frame basis). The SS/PBCH block that the base station transmits may include information for indicating the signal regarding the RIS pattern as described in detail in FIG. 9. 1205 may not be an essential step and the base station may perform only other operations except for 1205, and 1205 may be omitted. The base station may omit 1205 for the sake of synchronization signal transmission and beam sweeping.

At 1215, the base station may transmit a slot including a symbol related to a synchronization signal to the RIS and the terminal. The base station may generate at least one slot including a synchronization signal to be transmitted through at least one symbol, and the at least one symbol, although this operation is not illustrated in FIG. 12. The base station may transmit the at least one generated slot including the at least one symbol to the RIS and the terminal. The at least one symbol may be used to determine an operation that should be performed by the terminal during a predetermined time period including the at least one slot. Specifically, a signal regarding at least one RIS pattern that the base station transmits to the terminal may include the slot structure disclosed in FIGS. 7 to 10. The signal regarding the at least one RIS pattern that the base station transmits may include a synchronization signal and at least one slot. For example, the signal regarding the at least one RIS pattern may include at least one of slots for converting the RIS pattern, slots for detecting a beam index, or slots for transmitting data. The slots included in the signal regarding the RIS pattern may be mapped onto beam indexes for beam sweeping, respectively. The terminal may acquire time synchronization with the base station, based on the signal regarding the RIS pattern which is transmitted by the base station. The signal regarding the RIS pattern includes information regarding time synchronization, and accordingly, may be referred to as a synchronization signal. The roles of slots included in the signal regarding the RIS pattern or the mapped beam indexes have been described in FIGS. 7 to 10.

The RIS may convert the RIS pattern based on the signal regarding the RIS pattern, which is received from the base station, although this operation is not illustrated in FIG. 12. One symbol of symbols of the at least one slot included in the signal regarding the RIS pattern may indicate that the slot is a slot for converting the RIS pattern, and, when another symbol includes a specific RIS pattern index (corresponding to a specific beam index), the RIS may perform RIS pattern conversion corresponding to the specific RIS pattern index. In this case, the terminal which receives the same signal regarding the RIS pattern may enter an idle mode.

At 1225, the base station may receive a result of measuring beams from the terminal. The result of measuring beams may be generated by the terminal. The terminal may measure beams based on the signal regarding the RIS pattern which is received from the base station. For example, the terminal may identify that at least one slot is a slot for detecting a beam index, based on one symbol of symbols of the at least one slot included in the received signal regarding the RIS pattern, and may identify a beam index corresponding to the at least one slot based on another symbol. The terminal may measure beams based on the identified beam index. As a parameter used for measuring beams, RSRP may be normally used, but the parameter may include at least one of an RSSI, RSRQ, an SINR, CQI, an MCS, or an RI, and may further include substantially the same or similar parameter. The base station may receive the result of measuring beams from the terminal. The terminal may receive signals transmitted according to RIS patterns in sequence according to beam indexes, and may report results of measuring beams to the base station.

At 1235, the base station may determine a RIS pattern for transmitting data. According to an embodiment, the base station may determine an optimal RIS pattern based on the results of measuring beams, which are received from the terminal. The base station may generate a signal regarding a RIS pattern for transmitting data based on the determined RIS pattern. At least one slot included in the signal regarding the RIS pattern for transmitting data may include a symbol that is mapped onto the determined RIS pattern index and a symbol that indicates RIS pattern conversion. Alternatively, the at least one slot may include a symbol indicating data decoding and symbols for transmitting data.

At 1245, the base station may transmit a signal for controlling the RIS pattern and a data signal to the RIS or terminal. The base station may transmit the signal regarding the RIS pattern which is generated based on the determined RIS pattern to the RIS and the terminal. The RIS may receive the signal regarding the RIS pattern, and may convert the RIS pattern based on at least one slot which includes a symbol mapped onto the determined RIS pattern index, and a symbol indicating RIS pattern conversion. In this case, the terminal which receives the same signal regarding the RIS pattern may enter an idle mode. When the RIS pattern is converted, the terminal may receive at least one slot for decoding data based on the converted RIS pattern (for example, the determined RIS pattern), and may receive and decode data based on the at least one slot.

Through the above-described steps, the base station may transmit the synchronization signal having complexity reduced, and the signal for beam sweeping to the terminal, and may enable data signal transmission and reception to which the optimal beam or RIS reflection pattern is applied, based on the signals. However, this is merely an example, and some of the above-described steps may be omitted according to various embodiments. A symbol of a transmitted or received signal may have information elements mapped thereto through a certain sequence technique, or the structure of the slot may be modified as long as substantially the same or similar function is maintained.

Figure 13:
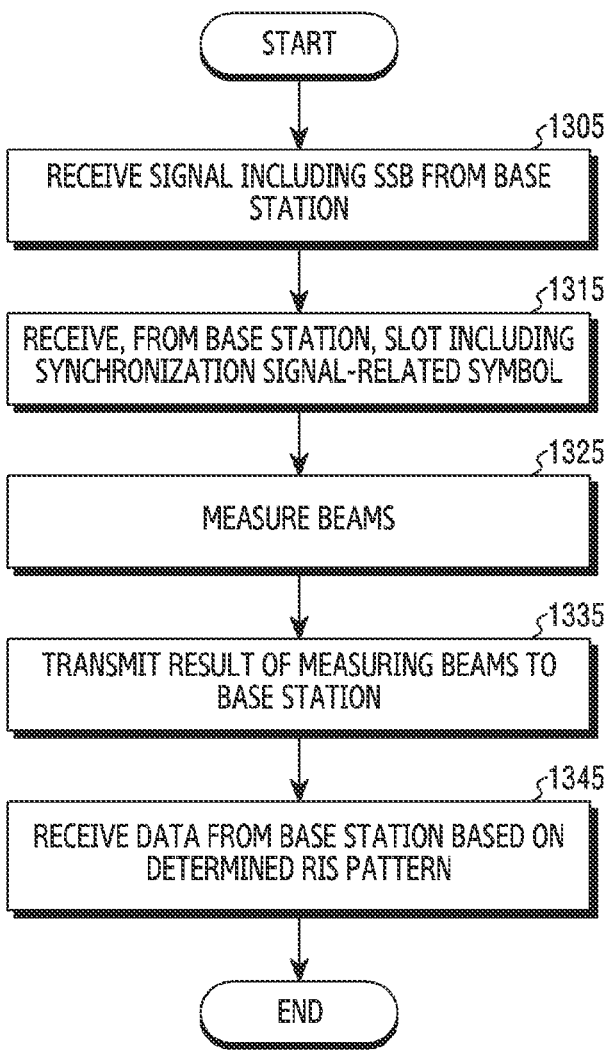
FIG. 13 is a flowchart illustrating a method for performing beam sweeping by using an RIS pattern in a terminal, according to an embodiment.

FIG. 13 is a flowchart illustrating a method for performing beam sweeping by using a RIS pattern in a terminal, according to an embodiment. Specifically, FIG. 13 illustrates an operation flow of the terminal for performing beam sweeping based on the signal regarding the RIS pattern, which is disclosed in FIGS. 6 to 10. However, this is merely an example, and the signal regarding the RIS pattern may include the structure of the slot disclosed in FIG. 8, or may include only the structure of the slot disclosed in FIG. 7.

At 1305, the terminal may receive a signal including an SS/PBCH block from the base station. For example, the terminal may receive a synchronization signal (e.g., an SS/PBCH block including a PSS, an SSS and a PBCH) of an NR system from the base station. The SS/PBCH block that the termina receives may include the SS/PBCH disclosed in FIG. 9. Accordingly, the terminal may periodically receive the signal including the SS/PBCH block of the NR system from the base station, and simultaneously, may receive a signal regarding a RIS pattern from the base station every specific period (for example, on a slot or frame basis). The SS/PBCH block that the terminal receives may include information for indicating the signal regarding the RIS pattern as described in detail in FIG. 9. 1305 may not be an essential step and the terminal may perform only other operations except for 1305, and 1305 may be omitted. The terminal may omit 1305 for the sake of synchronization signal transmission and beam sweeping.

At 1315, the terminal may receive at least one slot including a symbol related to a synchronization signal from the base station. Before the terminal receives the at least one slot, the base station may generate at least one slot including a synchronization signal to be transmitted through at least one symbol, and the at least one symbol, although this operation is not illustrated in FIG. 13. The terminal may receive the at least one slot including the at least one symbol, which is generated by the base station, from the base station. The at least one symbol may be used to determine an operation that should be performed by the terminal during a predetermined time period including the at least one slot. Specifically, a signal regarding at least one RIS pattern that the terminal receives from the base station may include the slot structure disclosed in FIGS. 7 to 10. The signal regarding the at least one RIS pattern that the terminal receives may include a synchronization signal and at least one slot.

For example, the signal regarding the at least one RIS pattern may include at least one of slots for converting the RIS pattern, slots for detecting a beam index, or slots for transmitting data. The slots included in the signal regarding the RIS pattern may be mapped onto beam indexes for beam sweeping, respectively. The terminal may acquire time synchronization with the base station, based on the signal regarding the RIS pattern which is received. The signal regarding the RIS pattern includes information regarding time synchronization, and accordingly, may be referred to as a synchronization signal. The roles of slots included in the signal regarding the RIS pattern or the mapped beam indexes have been described in FIGS. 7 to 10.

The RIS may convert the RIS pattern based on the signal regarding the RIS pattern, which is received from the base station, although this operation is not illustrated in FIG. 13. One symbol of symbols of the at least one slot included in the signal regarding the RIS pattern may indicate that the slot is a slot for converting the RIS pattern, and, when another symbol includes a specific RIS pattern index (corresponding to a specific beam index), the RIS may perform RIS pattern conversion corresponding to the specific RIS pattern index. In this case, the terminal which receives the same signal regarding the RIS pattern may enter an idle mode.

At 1325, the terminal may measure beams. The terminal may measure beams based on the signal regarding the RIS pattern which is received from the base station. For example, the terminal may identify that at least one slot is a slot for detecting a beam index, based on one symbol of symbols of the at least one slot included in the received signal regarding the RIS pattern, and may identify a beam index corresponding to the at least one slot based on another symbol. The terminal may measure beams based on the identified beam index. As a parameter used for measuring beams, RSRP may be normally used, but the parameter may include at least one of an RSSI, RSRQ, an SINR, CQI, an MCS, or an RI, and may further include substantially the same or similar parameter.

At 1335, the terminal may transmit a result of measuring beams to the base station. The terminal may receive signals transmitted according to RIS patterns in sequence according to beam indexes, and may report results of measuring beams to the base station. The base station may determine an optimal RIS pattern based on the results of measuring beams received from the terminal. The base station may generate a signal regarding the RIS pattern for transmitting data based on the determined RIS pattern. At least one slot included in the signal regarding the RIS pattern for transmitting data may include a symbol that is mapped onto the determined RIS pattern index and a symbol that indicates RIS pattern conversion. Alternatively, the at least one slot may include a symbol that indicates data decoding and symbols for transmitting data.

At 1345, the terminal may receive a data signal from the base station. The terminal may receive a signal regarding the RIS pattern which is generated based on the determined RIS pattern from the base station. The RIS may receive the signal regarding the RIS pattern, and may convert the RIS pattern, based on at least one slot including a symbol that is mapped onto the determined RIS pattern index and a symbol that indicates the RIS pattern conversion. In this case, the terminal which receives the same signal regarding the RIS pattern may enter an idle mode. When the RIS pattern is converted, the terminal may receive at least one slot for data decoding based on the converted RIS pattern (for example, the determined RIS pattern), and may receive and decode the data based on the slot.

Through the above-described steps, the base station may transmit the synchronization signal having complexity reduced, and the signal for beam sweeping to the terminal, and may enable data signal transmission and reception to which the optimal beam or RIS reflection pattern is applied, based on the signals. However, this is merely an example, and some of the above-described steps may be omitted according to various embodiments. A symbol of a transmitted or received signal may have information elements mapped thereto through a certain sequence technique, or the structure of the slot may be modified as long as substantially the same or similar function is maintained.

A method performed by a base station in a wireless communication system is provided. The method includes: generating at least one slot including at least one symbol and a synchronization signal, which is transmitted through the at least one symbol; transmitting, to a RIS and a UE, the at least one slot including the at least one symbol, wherein the at least one symbol is used to determine an operation to be performed by the UE during a predetermined time period including the at least one slot; transmitting, to the UE, the at least one slot including the synchronization signal through one or more beams formed according to a first RIS pattern; receiving, from the UE, a result of measuring each beam based on the one or more beams formed according to the first RIS pattern; determining a second RIS pattern for transmitting data based on the result of measuring each beam; transmitting, to the RIS, a signal for controlling the first RIS pattern based on the second RIS pattern; and transmitting, to the UE, a data signal through the RIS, wherein the second RIS pattern is applied to the RIS.

The at least one slot includes at least one other symbol including an indicator indicating the one or more beams formed according to the first RIS pattern, wherein the at least one symbol is mapped based on an in-sequence, and wherein the at least one other symbol is encoded by using a CS which is based on a Zadoff-Chu sequence.

The method may further include: transmitting, to the UE, a signal including an SSB, wherein the signal including the SSB includes information for indicating the at least one slot, and wherein the information for indicating the at least one slot includes at least one of a flag indicator for the at least one slot, information regarding an offset for the at least one slot, or information regarding a transmission period for the at least one slot.

The at least one symbol includes information indicating that a section of the at least one slot is a section for performing one of conversion of the first RIS pattern, detection of an RIS pattern index, or decoding of data.

In case that the at least one symbol indicates that the section of the at least one slot is a section for performing the conversion of the first RIS pattern, the method further comprises: transmitting configuration information indicating the conversion of the first RIS pattern to the RIS; and transmitting, to the UE, configuration information indicating that the UE is to enter an idle mode.

A method performed by a UE in a wireless communication system is provided. The method includes: receiving, from a base station, at least one slot including at least one symbol and a synchronization signal, which is transmitted through the at least one symbol, wherein the at least one symbol is used to determine an operation to be performed by the UE during a predetermined time section comprising the at least one slot; receiving, from the base station, the at least one slot including the synchronization signal through one or more beams formed according to a RIS pattern; measuring each beam based on the one or more beams formed according to the RIS pattern; transmitting a result of measuring each beam to the base station; and receiving, from the base station, a data signal through an RIS, wherein the RIS pattern determined based on the result of measuring each beam is applied to the RIS.

The at least one slot includes at least one other symbol including an indicator indicating the one or more beams formed according to the RIS pattern, wherein the at least one symbol is mapped based on an in-sequence, wherein the at least one other symbol is encoded by using a CS which is based on a Zadoff-Chu sequence, wherein the method further comprises: identifying an operation to be performed by the UE, based on a correlation value of the in-sequence transmitted through the at least one symbol; and identifying the one or more beams formed according to the RIS pattern, based on a correlation value of the Zadoff-Chu sequence transmitted through the at least one other symbol.

The method may further include: receiving, from the base station, a signal including an SSB, wherein the signal including the SSB includes information for indicating the at least one slot, and wherein the information for indicating the at least one slot includes at least one of a flag indicator for the at least one slot, information regarding an offset for the at least one slot, or information regarding a transmission period for the at least one slot.

The at least one symbol includes information indicating that a section of the at least one slot is a section for performing one of conversion of the RIS pattern, detection of an RIS pattern index, or decoding of data.

In case that the at least one symbol indicates that the section of the at least one slot is the section for converting the RIS pattern, the method further includes receiving, from the base station, configuration information indicating the UE to enter an idle mode.

A base station in a wireless communication system is provided The base station includes: at least one transceiver; and at least one processor functionally coupled with the at least one transceiver, wherein the at least one processor is configured to: generate at least one slot including at least one symbol and a synchronization signal, which is transmitted through the at least one symbol; transmit, to a RIS and a UE, the at least one slot including the at least one symbol, wherein the at least one symbol is used to determine an operation to be performed by the UE during a predetermined time period including the at least one slot; transmit, to the UE, the at least one slot including the synchronization signal through one or more beams formed according to a first RIS pattern; receive, from the UE, a result of measuring each beam based on the one or more beams formed according to the first RIS pattern; determine a second RIS pattern for transmitting data based on the result of measuring each beam; transmit, to the RIS, a signal for controlling the first RIS pattern based on the second RIS pattern; and transmit, to the UE, a data signal through the RIS, wherein the determined RIS pattern is applied to the RIS.

The at least one slot includes at least one other symbol including an indicator indicating the one or more beams formed according to the first RIS pattern, wherein the at least one symbol is mapped based on an in-sequence, and wherein the at least one other symbol is encoded by using a CS which is based on a Zadoff-Chu sequence.

The at least one processor is further configured to transmit, to the UE, a signal including an SSB, wherein the signal including the SSB includes information for indicating the at least one slot, and wherein the information for indicating the at least one slot includes at least one of a flag indicator for the at least one slot, information regarding an offset for the at least one slot, or information regarding a transmission period for the at least one slot.

The at least one symbol includes information indicating that a section of the at least one slot is a section for performing one of conversion of the first RIS pattern, detection of an RIS pattern index, or decoding of data.

In case that the at least one symbol indicates that the section of the at least one slot is the section for performing the conversion of the first RIS pattern, the at least one processor is further configured to: transmit configuration information indicating the conversion of the first RIS pattern to the RIS; and transmit, to the UE, configuration information indicating that the UE is to enter an idle mode.

A UE in a wireless communication system is provided. The UE includes at least one transceiver; and at least one processor functionally coupled with the at least one transceiver, wherein the at least one processor is configured to: receive, from a base station, at least one slot including at least one symbol and a synchronization signal, which is transmitted through the at least one symbol, wherein the at least one symbol is used to determine an operation to be performed by the UE during a predetermined time section comprising the at least one slot; receive, from the base station, the at least one slot including the synchronization signal through one or more beams formed according to a RIS pattern; measure each beam based on the one or more beams formed according to the RIS pattern; transmit a result of measuring each beam to the base station; and receive, from the base station, a data signal from the base station through an RIS, wherein the RIS pattern determined based on the result of measuring each beam is applied to the RIS.

The at least one slot includes at least one other symbol including an indicator indicating the one or more beams formed according to the RIS pattern, wherein the at least one symbol is mapped based on an in-sequence, wherein the at least one other symbol is encoded by using a CS which is based on a Zadoff-Chu sequence, wherein the at least one processor is further configured to: identify an operation to be performed by the UE, based on a correlation value of the in-sequence transmitted through the at least one symbol; and identify the one or more beams formed according to the RIS pattern, based on a correlation value of the Zadoff-Chu sequence transmitted through the at least one other symbol.

The at least one processor is further configured to receive, from the base station, a signal including an SSB, wherein the signal including the SSB includes information for indicating the at least one slot, wherein the information for indicating the at least one slot includes at least one of a flag indicator for the at least one slot, information regarding an offset for the at least one slot, or information regarding a transmission period for the at least one slot.

The at least one symbol includes information indicating that a section of the at least one slot is a section for performing one of conversion of the RIS pattern, detection of an RIS pattern index, or decoding of data.

In case that the at least one symbol indicates that the section of the at least one slot is the section for converting the RIS pattern, the at least one processor is further configured to receive, from the base station, configuration information indicating the UE to enter an idle mode.

The disclosure provides an apparatus and a method for effectively providing a service in a wireless communication system.

The effect achieved by the disclosure is not limited to those mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the disclosure.

What is claimed is:

1. A method performed by a base station in a wireless communication system, the method comprising:

identifying a slot including a first symbol for a synchronization signal;

transmitting, to a reconfigurable intelligent surface (RIS) and a user equipment (UE), a first signal on the slot including the first symbol, wherein the first symbol indicates the slot is for an operation to be performed by the UE;

transmitting, to the UE, a second signal through one or more beams formed according to a first RIS pattern;

receiving, from the UE, a result of measuring each beam based on the one or more beams formed according to the first RIS pattern;

determining a second RIS pattern for transmitting data based on the result of measuring each beam;

transmitting, to the RIS, a third signal for controlling the first RIS pattern based on the second RIS pattern;

transmitting, to the UE, a data signal through the RIS, wherein the second RIS pattern is applied to the RIS; and based on the first symbol indicating the slot is for a conversion of the first RIS pattern, transmitting, to the UE, information configuring the UE to enter an idle mode.

2. The method of claim 1, wherein:

the slot includes a second symbol including an indicator indicating the one or more beams formed according to the first RIS pattern, the first symbol is mapped based on an m-sequence, and the second symbol is encoded by using a cyclic shift (CS) which is based on a Zadoff-Chu sequence.

3. The method of claim 1, further comprising:

transmitting, to the UE, a synchronization signal block (SSB), wherein the SSB includes information for the slot, and wherein the information for the slot includes at least one of a flag indicator for the slot, information associated with an offset for the slot, or information associated with a transmission period for the slot.

4. The method of claim 1, wherein the first symbol includes information indicating the slot is associated with the operation for one of the conversion of the first RIS pattern, a detection of an RIS pattern index, or a decoding of data.

5. The method of claim 1, based on the first symbol indicating the slot is for the conversion of the first RIS pattern, further comprising:

transmitting, to the RIS, information configuring conversion of the first RIS pattern.

6. A method performed by a user equipment (UE) in a wireless communication system, the method comprising:

receiving, from a base station, a first signal on a slot including a first symbol for a synchronization signal, wherein the first symbol indicates the slot is for an operation to be performed by the UE;

receiving, from the base station, a second signal through one or more beams formed according to a first reconfigurable intelligent surface (RIS) pattern;

measuring each beam based on the one or more beams formed according to the first RIS pattern;

transmitting, to the base station, a result of measuring each beam;

receiving, from the base station, a data signal through an RIS, wherein a second RIS pattern determined based on the result of measuring each beam is applied to the RIS, and based on the first symbol indicating the slot is for a conversion of the first RIS pattern, receiving, from the base station, information configuring the UE to enter an idle mode.

7. The method of claim 6, wherein:

the slot includes a second symbol including an indicator indicating the one or more beams formed according to the first RIS pattern, the first symbol is mapped based on an m-sequence, the second symbol is encoded by using a cyclic shift (CS) which is based on a Zadoff-Chu sequence, and the method further comprises:

identifying the operation to be performed by the UE, based on a correlation value of the m-sequence transmitted through the first symbol; and identifying the one or more beams formed according to the first RIS pattern, based on a correlation value of the Zadoff-Chu sequence transmitted through the second symbol.

8. The method of claim 6, further comprising:

receiving, from the base station, a synchronization signal block (SSB), wherein the SSB includes information for the slot, and wherein the information for the slot includes at least one of a flag indicator for the slot, information associated with an offset for the slot, or information associated with a transmission period for the slot.

9. The method of claim 6, wherein the first symbol includes information indicating the slot is associated with the operation for one of the conversion of the first RIS pattern, a detection of an RIS pattern index, or a decoding of data.

10. A base station in a wireless communication system, the base station comprising:

a transceiver; and a controller coupled with the transceiver, and configured to:

identify a slot including a first symbol for a synchronization signal;

transmit, to a reconfigurable intelligent surface (RIS) and a user equipment (UE), a first signal on the slot including the first symbol, wherein the first symbol indicates the slot is for an operation to be performed by the UE;

transmit, to the UE, a second signal through one or more beams formed according to a first RIS pattern;

receive, from the UE, a result of measuring each beam based on the one or more beams formed according to the first RIS pattern;

determine a second RIS pattern for transmitting data based on the result of measuring each beam;

transmit, to the RIS, a third signal for controlling the first RIS pattern based on the second RIS pattern;

transmit, to the UE, a data signal through the RIS, wherein the second RIS pattern is applied to the RIS, and based on the first symbol indicating the slot is for a conversion of the first RIS pattern, transmit, to the UE, information configuring the UE to enter an idle mode.

11. The base station of claim 10, wherein:

the slot includes a second symbol including an indicator indicating the one or more beams formed according to the first RIS pattern, the first symbol is mapped based on an m-sequence, and the second symbol is encoded by using a cyclic shift (CS) which is based on a Zadoff-Chu sequence.

12. The base station of claim 10, wherein:

the controller is further configured to transmit, to the UE, a synchronization signal block (SSB), wherein the SSB includes information for the slot, and wherein the information for the slot includes at least one of a flag indicator for the slot, information associated with an offset for the slot, or information associated with a transmission period for the slot.

13. The base station of claim 10, wherein the first symbol includes information indicating the slot is associated with the operation for one of the conversion of the first RIS pattern, a detection of an RIS pattern index, or a decoding of data.

14. The base station of claim 13, wherein, based on the first symbol indicating the slot is for the conversion of the first RIS pattern, the controller is further configured to:

transmit, to the RIS, information configuring the conversion of the first RIS pattern.

15. A user equipment (UE) in a wireless communication system, the UE comprising:

a transceiver; and a controller coupled with the transceiver, and configured to:

receive, from a base station, a first signal on a slot including a first symbol for a synchronization signal, wherein the first symbol indicates the slot is for an operation to be performed by the UE;

receive, from the base station, a second signal through one or more beams formed according to a first reconfigurable intelligent surface (RIS) pattern;

measure each beam based on the one or more beams formed according to the first RIS pattern;

transmit, to the base station, a result of measuring each beam;

receive, from the base station, a data signal through an RIS, wherein a second RIS pattern determined based on the result of measuring each beam is applied to the RIS; and based on the first symbol indicating the slot is for a conversion of the first RIS pattern, receive, from the base station, information configuring the UE to enter an idle mode.

16. The UE of claim 15, wherein:

the slot includes a second symbol including an indicator indicating the one or more beams formed according to the first RIS pattern, the first symbol is mapped based on an m-sequence, the second symbol is encoded by using a cyclic shift (CS) which is based on a Zadoff-Chu sequence, and the controller is further configured to:

identify the operation to be performed by the UE, based on a correlation value of the m-sequence transmitted through the first symbol; and identify the one or more beams formed according to the first RIS pattern, based on a correlation value of the Zadoff-Chu sequence transmitted through the second symbol.

17. The UE of claim 15, wherein:

the controller is further configured to receive, from the base station, a synchronization signal block (SSB), wherein the SSB includes information for the slot, and wherein the information for the slot includes at least one of a flag indicator for the slot, information associated with an offset for the slot, or information associated with a transmission period for the slot.

18. The UE of claim 15, wherein the first symbol includes information indicating the slot is associated with the operation for one of the conversion of the first RIS pattern, a detection of an RIS pattern index, or a decoding of data.

\* \* \* \* \*